(12) United States Patent
Andreopoulos et al.

(10) Patent No.: US 10,733,500 B2
(45) Date of Patent: Aug. 4, 2020

(54) SHORT-TERM MEMORY USING NEUROMORPHIC HARDWARE

(71) Applicant: International Business Machines Corporation, Armonk, NY (US)

(72) Inventors: Alexander Andreopoulos, San Jose, CA (US); Andrew S. Cassidy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 14/919,695

(22) Filed: Oct. 21, 2015

(65) Prior Publication Data
US 2017/0116513 A1  Apr. 27, 2017

(51) Int. Cl.
*G06N 3/04* (2006.01)
*G06N 3/063* (2006.01)

(52) U.S. Cl.
CPC .......... *G06N 3/0445* (2013.01); *G06N 3/049* (2013.01); *G06N 3/063* (2013.01)

(58) Field of Classification Search
CPC ....... G06N 2/0445; G06N 3/049; G06N 3/063
See application file for complete search history.

(56) References Cited

U.S. PATENT DOCUMENTS

| | | | |
|---|---|---|---|
| 6,021,453 A * | 2/2000 | Klingman | H04L 12/40123 710/305 |
| 8,725,658 B2 | 5/2014 | Izhikevich et al. | |
| 2012/0084241 A1 | 4/2012 | Friedman et al. | |
| 2013/0325774 A1 * | 12/2013 | Sinyavskiy | G06N 3/049 706/23 |
| 2014/0344202 A1 | 11/2014 | Thibeault et al. | |
| 2015/0039546 A1 | 2/2015 | Alvarez-Icaza et al. | |
| 2015/0046382 A1 | 2/2015 | Rangan | |
| 2015/0106306 A1 | 4/2015 | Birdwell et al. | |
| 2015/0294217 A1 * | 10/2015 | Aparicio, IV | G06N 3/049 706/26 |

OTHER PUBLICATIONS

Shu, et al., "Turning on and off recurrent balanced cortical activity", Nature, vol. 423, May 15, 2003 (Year: 2003).*

(Continued)

*Primary Examiner* — Robert A Cassity
*Assistant Examiner* — Tsu-Chang Lee
(74) *Attorney, Agent, or Firm* — Zilka-Kotab, P.C.

(57) ABSTRACT

In one embodiment, a system includes one or more electronic neurons and one or more electronic axons. Each neuron is connected to at least one electronic axon via an electronic synapse, and at least one of the one or more electronic neurons is configured to store information in a membrane potential thereof and/or at least one of the one or more electronic axons is configured to store information in an axon delay buffer thereof to act as a memory. In another embodiment, a computer-implemented method includes storing information to a memory comprising electronic neurons and electronic axons. Information is stored in either a membrane potential of at least one of the electronic neurons or in an axon delay buffer of at least one of the electronic axons. Also, each neuron is connected to at least one electronic axon via an electronic synapse.

24 Claims, 23 Drawing Sheets

(56) References Cited

OTHER PUBLICATIONS

Gutkin, et al., "Turning On and Off with Excitation: The Role of Spike-Timing Asynchrony and Synchrony in Sustained Neural Activity", Journal of Computational Neuroscience 11, 121-134, 2001 (Year: 2001).*
Cowan, et al., "Discussion: McCulloch-Pitts and Related Neural Nets from 1943 to 1989", Bulletin of Mathematical Biology, vol. 52, No. 1/2, pp. 73-97, 1990 (Year: 1990).*
Catanzaro et al. "Ubiquitous Parallel Computing from Berkeley, Illinois, and Stanford," IEEE Micro, vol. 30, No. 2, Mar./Apr. 2010, pp. 41-55.
Conway et al. "Working memory capacity and its relation to general intelligence," Trends in Cognitive Sciences, vol. 7, No. 12, Dec. 2003, pp. 547-552.
Alloway et al. "Investigating the predictive roles of working memory and IQ in academic attainment," Journal of Experimental Child Psychology, vol. 106, May 2010, pp. 20-29.
Fukuda et al. "Human Variation in Overriding Attentional Capture," The Journal of Neuroscience, vol. 29, Jul. 2009, pp. 8726-8733.
Wikipedia, "Working Memory," Wikipedia, the free encyclopedia, Jul. 2015, pp. 1-18, retrieved from http://en.wikipedia.org/wiki/Working_memory.
Schmeichel et al. "Working Memory Capacity and the Self-Regulation of Emotional Expression and Experience," Journal of Personality and Social Psychology, vol. 95, No. 6, Dec. 2008, pp. 1526-1540.
Kenworthy et al. "Understanding executive control in autism spectrum disorders in the lab and in the real world," Neuropsychology Review, vol. 18, No. 4, Dec. 2008, pp. 320-338.
Levy et al. "Working Memory in ADHD: Prefrontal/Parietal Connections," Current Drug Targets, vol. 2, No. 4, Dec. 2001, pp. 347-352.
Alloway, T. "Working memory, reading, and mathematical skills in children with developmental coordination disorder," Journal of Experimental Child Psychology, vol. 96, No. 1, Jan. 2007, pp. 20-36.
Baddeley et al. "Working Memory," The Psychology of Learning and Motivation, Academinc Press, Inc. vol. 2, Jan. 1974, pp. 47-89.
Moorhead, P., "Tech Giants: Move to Specialized Computing or Die," Forbes.com, retrieved from http://onforb.es/13JQEYC, Aug. 2013, pp. 1-4.
Hochreiter et al., "Long Short-Term Memory," Neural Computation, vol. 9, No. 8, Nov. 15, 1997, pp. 1735-1780.
Cassidy et al., "Cognitive Computing Building Block: A Versatile and Efficient Digital Neuron Model for Neurosynaptic Cores," Proceedings of IEEE International Joint Conference on Neural Networks, Aug. 2013, pp. 1-10.
Merolla et al., "A million spiking-neuron integrated circuit with a scalable communication network and interface," Science, vol. 345, Aug. 8, 2014, pp. 668-673.
Cassidy et al., "Real-time Scalable Cortical Computing at 46 Giga-Synaptic OPS/Watt with ~100× Speedup in Time-to-Solution and ~100,000× Reduction in Energy-to-Solution," Proceedings of the international conference for high performance computing, networking, storage and analysis, IEEE Press, Nov. 2014, pp. 27-38.
Amir et al., "Cognitive computing programming paradigm: a corelet language for composing networks of neurosynaptic cores," Neural Networks (IJCNN), IEEE, Aug. 2013, pp. 1-10.
Jo et al., "Nanoscale memristor device as synapse in neuromorphic systems," Nano letters, vol. 10, Mar. 1, 2010, pp. 1297-1301.
Indiveri et al., "A VLSI array of low-power spiking neurons and bistable synapses with spike-timing dependent plasticity," IEEE Transactions on Neural Networks, vol. 17, No. 1, Jan. 2006, pp. 211-221.
Alvarez-Icaza et al., U.S. Appl. No. 13/957,805, filed Aug. 2, 2013.

\* cited by examiner

| Time to Spike | Burst | Rate | |
|---|---|---|---|
|  | ○ | ○ | t = 1 |
|  | ○ |  | t = 2 |
|  | ○ |  | t = 3 |
|  | ○ | ○ | t = 4 |
|  | ○ | ○ | t = 5 |
|  | ○ |  | t = 6 |
| ○ | ○ |  | t = 7 |
|  |  | ○ | t = 8 |
|  |  |  | t = 9 |
|  |  |  | t = 10 |
|  |  | ○ | t = 11 |
|  |  |  | t = 12 |
|  |  |  | t = 13 |
|  |  | ○ | t = 14 |
|  |  |  | t = 15 |
|  |  | ○ | t = 16 |

FIG. 2

SYNAPTIC INTEGRATION

$$V_j(t) = V_j(t-1) + \sum_{i=0}^{255} A_i(t)\, w_{i,j}[(1-b_j^{G_i})s_j^{G_i} + b_j^{G_i} F(s_j^{G_i}, p_{i,j})\,\text{sgn}(s_j^{G_i})]$$

LEAK INTEGRATION

$$\Omega = (1-\varepsilon_j) + \varepsilon_j\,\text{sgn}(V_j(t))$$

$$V_j(t) = V_j(t) + \Omega\,[(1-c_j^\lambda)\lambda_j + c_j^\lambda F(\lambda_j, p_j^\lambda)\,\text{sgn}(\lambda_j)]$$

THRESHOLD, FIRE, RESET

$$\eta_j = p_j^T \,\&\, M_j$$

if $\quad V_j(t) \geq \alpha_j + \eta_j$

Spike

$$V_j(t) = \delta(\gamma_j)R_j + \delta(\gamma_j - 1)(V_j(t) - (\alpha_j + \eta_j)) + \delta(\gamma_j - 2)V_j(t)$$

elseif $\quad V_j(t) < -[\beta_j\kappa_j + (\beta_j + \eta_j)(1-\kappa_j)]$ $$V_j(t) = -\beta_j\kappa_j + [-\delta(\gamma_j)R_j + \delta(\gamma_j - 1)(V_j(t) + (\beta_j + \eta_j)) + \delta(\gamma_j - 2)V_j(t)](1-\kappa_j)$$

endif

FIG. 3

SHORT-TERM MEMORY USING NEUROMORPHIC HARDWARE

STATEMENT REGARDING FEDERALLY SPONSORED RESEARCH OR DEVELOPMENT

This invention was made with Government support under HR0011-09-C-0002 awarded by Defense Advanced Research Projects Agency (DARPA). The Government has certain rights in this invention.

BACKGROUND

The present invention relates to neuromorphic hardware, and more specifically, to writing, storing, and reading data using neural computation in neuromorphic hardware.

In the era of heterogeneous computing, it is anticipated that programmers will either be domain experts or sophisticated computer scientists, because few domain experts have the time to develop performance programming skills and few computer scientists have the time to develop domain expertise. The computer scientists will create frameworks and software stacks that enable domain experts to develop applications without needing to understand details of the underlying platforms.

Some of the potential benefits of heterogeneity over current practices include, but are not limited to, more efficient use of memory bandwidth, more performance per area, more performance per watt, fewer modules, boards, racks, etc.

Neural computation and neuromorphic hardware are one example of a domain specific computing approach, improving performance per watt over traditional von Neumann approaches.

Within this context, many neural computations require the ability to store, retrieve, reset, and update information at both regular and irregular intervals. For example, this may include storing a video frame, and retrieving it multiple times to perform a different operation at each retrieval, or storing a sound clip and retrieving it multiple times at the request of a user (e.g., to replay the sound clip, to perform some signal processing operation on the sound clip, etc.). At the same time, the control signals for retrieving, resetting, and updating the information may arrive at non-deterministic intervals. Moreover, short-term memory mechanisms play an extremely important role in some of the best performing neural-inspired object recognition systems.

Standard von Neumann architectures are naturally suited for storing data in memory. A typical sequence of operations may include, but is not limited to, copying data to random access memory (RAM), transferring the data from the RAM via a bus to the central processing unit (CPU), and processing the data using the CPU. This sequence of events may be repeated many times over.

In other words, the distinction between memory and processing unit is a distinguishing factor in the von Neumann architecture. However, the distinction between memory and processing unit is not so clear cut in neuromorphic architectures, making the solution to this task difficult to solve. This hinders the ability to create a hybrid/heterogeneous programming paradigm for enabling a von Neumann architecture to communicate and interact with a non-von Neumann architecture. Any non-trivial application requires modules for a form of short-term/working memory. The negative effects associated with the lack of a mechanism for storing and retrieving information is only exacerbated in a hybrid programming environment.

A memory mechanism is extremely rare in classical, non-spiking neural networks. Usually such mechanisms are implicit and do not permit resetting or querying the contents at non-deterministic intervals. In spiking neural networks, no known mechanisms implemented in hardware are known.

For heterogeneous computing applications, one option may utilize storing data in a von Neumann architecture's RAM and transfer the data to the neuromorphic hardware as needed. This has the drawback associated with von Neumann architectures, namely the high power cost associated with transferring information from RAM via a bus to the neuromorphic architecture. Thus, there are no known options available for constructing low power heterogeneous applications.

SUMMARY

In one embodiment, a system includes one or more electronic neurons and one or more electronic axons. Each neuron is connected to at least one electronic axon via an electronic synapse, and at least one of the one or more electronic neurons is configured to store information in a membrane potential thereof and/or at least one of the one or more electronic axons is configured to store information in an axon delay buffer thereof to act as a memory.

In another embodiment, a computer-implemented method includes storing information to a memory comprising one or more electronic neurons and one or more electronic axons. Information is stored in either a membrane potential of at least one of the one or more electronic neurons or in an axon delay buffer of at least one of the one or more electronic axons. Also, each neuron is connected to at least one electronic axon via an electronic synapse.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 2 is a representation of spikes using rate, time, and/or place at which the spikes are created.

FIG. 3 depicts the neuron equation.

DETAILED DESCRIPTION

Figure 1:
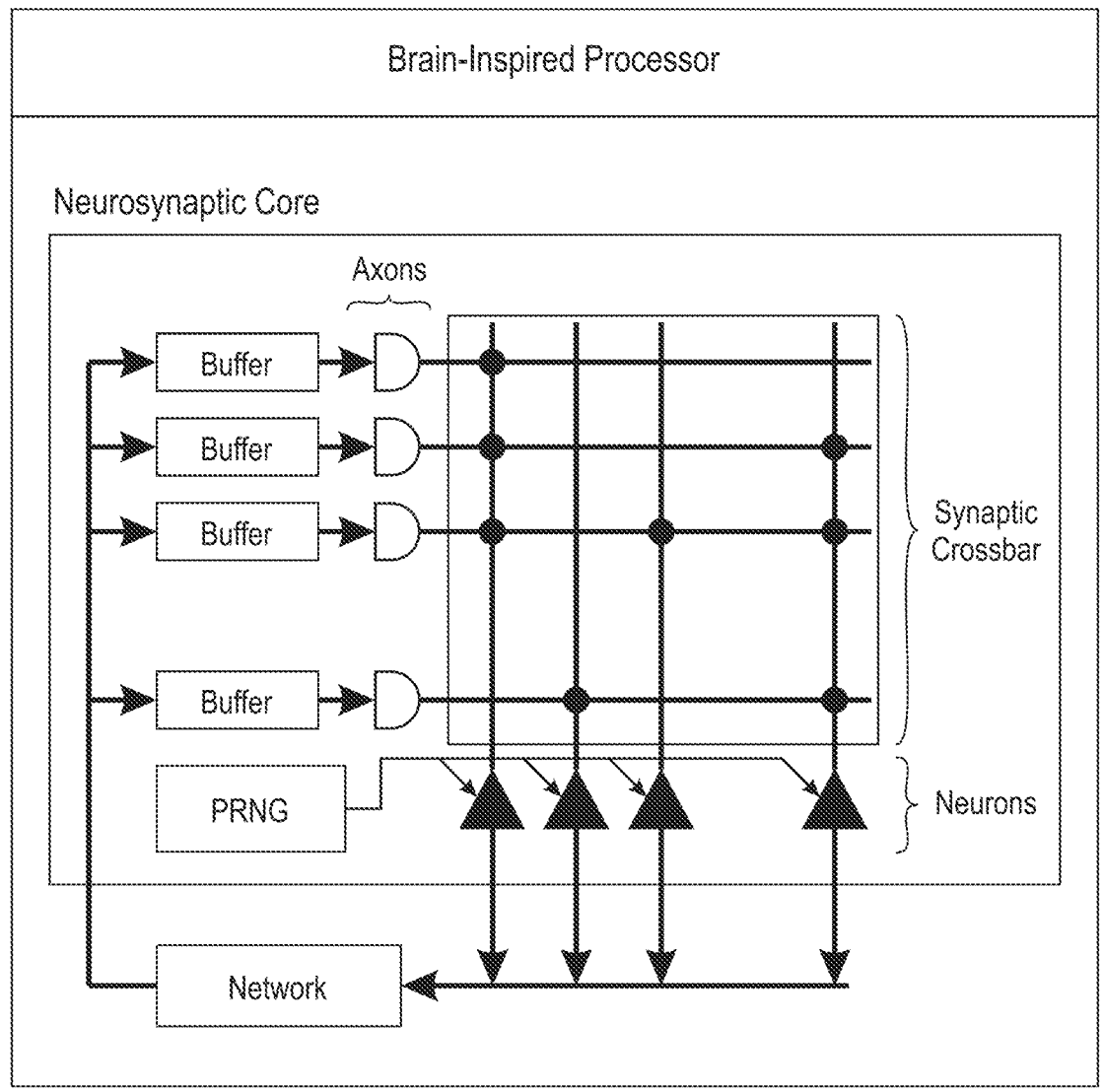
FIG. 1 depicts a binary crossbar implemented in a brain-inspired processor, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of methods and systems using neuromorphic hardware to write (e.g., set, reset, clear, and update), store, and read (e.g., access, query, and retrieve) information stored in neurons.

In one general embodiment, a system includes one or more electronic neurons and one or more electronic axons. Each neuron is connected to at least one electronic axon via an electronic synapse, and at least one of the one or more electronic neurons is configured to store information in a membrane potential thereof and/or at least one of the one or more electronic axons is configured to store information in an axon delay buffer thereof to act as a memory.

In another general embodiment, a computer-implemented method includes storing information to a memory comprising one or more electronic neurons and one or more electronic axons. Information is stored in either a membrane potential of at least one of the one or more electronic neurons or in an axon delay buffer of at least one of the one or more electronic axons. Also, each neuron is connected to at least one electronic axon via an electronic synapse.

According to various embodiments, both a stochastic neuron and a deterministic neuron may be used, alone or in combination, to provide short-term memory. Binary, burst, and rate coded input data is supported with this short-term memory. Input axons are provided, through which the desired input data is presented to the memory. Control axons are provided for read/write control of information stored in the memory. Neuronal outputs are used to read data stored in the memory.

Embodiments of neuromorphic hardware configured to act as short-term memory or to aid in the storage/retrieval of information from short-term memory include a bistable neuron, a tristable neuron, a pass gate, a binary probe memory, a rate-based probe memory, a deterministic rate store (with/without clear), and a stochastic rate store. These structures may be employed on a neural network without modifying synaptic weights (which is why this is referred to as short-term/working memory).

In neuroscience, the terms short-term memory and working memory (also referred to as working attention) are synonyms that denote a system that is configured to actively hold and manipulate multiple pieces of information. Sometimes in literature, the term short-term memory is used to only denote the storage of information without describing mechanisms for manipulating it in memory. However, when short-term memory is referred to herein, it is intended to denote memory capable of both storage of information therein and retrieval of information therefrom.

A question arises whenever discussing short-term memory: what role does working memory play in humans' cognitive abilities? The neuroscience literature provides ample examples of its importance. According to some published literature:

1. It is believed that all memories need to pass through short-term memory before being stored as long term memories.
2. Working-memory has been linked to increased ability in complex cognitive tasks such as reading comprehension, general problem solving and intelligence quotient (IQ) measures.
3. A study showed that a 5 year old child's working memory predicts academic success better than test administered IQ measurements.
4. A strong link between working memory and attentional systems has been demonstrated. It contributes to choosing in a top-down fashion which bottom-up/salient information to selectively ignore or enhance, thus enabling a voluntary shift in a person's information processing.
5. Working memory impairments have been linked to:
    a. Emotion regulation problems.
    b. Autism spectrum disorders.
    c. Attention deficit hyperactivity disorder (ADHD).
    d. Decreased achievement in educational settings.
    e. Developmental coordination disorder.
6. Visual short term memory (the visual component of working memory) is believed to contribute to the bridging of the sensory gaps caused by saccadic eye movements (saccadic eye movements are sudden shifts of gaze which can occur 2-6 times per second).
7. The multicomponent model of working memory is a proposal on the coordination of cognitive processes and the directing of attention to relevant information, through the integration of a central executive system and two "slave systems":

a. The phonological loop which stores phonological information (sound).
b. The visuospatial sketchpad for storing visual and spatial information such as shape, color, texture and location.

It is clear that a theory of working/short-term memory is fundamental in the construction of a general theory of the brain, as well as in constructing associated neurosynaptic applications.

Any suitable brain-inspired processor may be used as the working environment for the various methods and systems described herein. A brain-inspired processor, according to one embodiment, may include a plurality of neurons and a plurality of synapses organized into neurosynaptic cores. The brain-inspired processor, in one embodiment, may be implemented in a silicon chip using conventional chip formation processes, but may be implemented in any other chip material known in the art suitable for supporting the brain-inspired processor, along with utilizing other known chip formation processes suitable for the chip material used. The neurosynaptic cores may be connected by a mesh network implemented in the chip and during the chip formation processing.

One such brain-inspired processor that may be utilized as the working environment for the various methods and systems described herein is IBM's TrueNorth. TrueNorth is a low-power, digital, spiking brain-inspired processor with one million neurons and 256 million synapses organized in 4,096 neurosynaptic cores. The TrueNorth processor is implemented in a 28 nm silicon process and has approximately 5.4 billion transistors. The cores are interconnected by a two-dimensional on-chip mesh network. Further, multiple TrueNorth chips may be seamlessly interconnected via one or more off-chip interfaces to produce brain-inspired processors with even greater processing power.

Each neurosynaptic core comprises 256 input axons $i \in \{0, \ldots, 255\}$ and 256 output neurons $j \in \{0, \ldots, 255\}$, interconnected by programmable binary synapses $W_{i,j}$, implemented as a 256×256 binary crossbar, as shown in FIG. 1. To implement weighted synapses, each axon i has a type index $G_i \in \{0, 1, 2, 3\}$ and each neuron j assigns a 9-bit signed weight, $S_j^{Gi}$, to axon type $G_i$. Thus, the effective weight from axon i to neuron j is $W_{i,j} \times s_j^{Gi}$.

Information is communicated via spikes, generated by neurons and sent to axon inputs via the on-chip/off-chip interconnection network. In the context of this description, a neuronal spike is a packet with a target delivery time, encoding the value 1. The absence of a spike corresponds implicitly to a value of 0. However, the reverse may be implemented in the methods and systems described herein, where the absence of a neuronal spike encodes the value 1, while a neuronal spike is a packet with a target delivery time, corresponding to a value of 0.

Each axon transfers the spike to each neuron it is connected to via the binary synaptic crossbar. Spikes may represent values using the rate, time, and/or place at which spikes are created, as shown in FIG. 2. A neurosynaptic core's operation is driven by a global clock with a nominal 1 ms tick, during which all spikes are delivered to their destinations.

The computation performed by each neuron, at every tick, is defined by the neuron equation, which is described in detail in A. S. Cassidy, P. Merolla, J. V. Arthur, S. K. Esser, B. Jackson, R. A Icaza, P. Datta, J. Sawada, T. M. Wong, V. Feldman, A. Amir, D. Ben-Dayan Rubin, F. Akopyan, E. McQuinn, W. P. Risk, and D. S. Modha. "Cognitive Computing Building Block: A Versatile and Efficient Digital Neuron Model for Neurosynaptic Cores". *Proceedings of IEEE International Joint Conference on Neural Networks*, (pp. 1-10) 2013. Moreover, the neuron equation is described in FIG. 3. It is an extension of the leaky integrate-and-fire neuron model and comprises five operations executed in sequence at every tick t.

Synaptic integration is now described according to one embodiment, with reference to the neuron equation described in FIG. 3. For each neuron j, the neuron state, or membrane potential $V_j(t)$, is the sum of the previous tick's membrane potential $V_j(t-1)$ and the weighted sum of a binary vector of input spikes, $A_i(t)$, that arrive at the neuron from up to the maximum number of input axons i (256 input axons i for TrueNorth), using the neuron's weight associated with the axon type $(S_j^{Gi})$, as shown in Equation 1, below.

$$V_j(t) = V_j(t-1) + \sum_i A_i(t) \times W_{ij} \times S_j^{Gi} \qquad \text{Equation 1}$$

Regarding leak integration, the neuron membrane potential $V_j(t)$ is incremented (or decremented) by a signed leak parameter $\lambda_j$, acting as a constant bias on the neuron dynamics. Moreover, after synaptic and leak integration, $V_j(t)$ is compared with a programmable threshold $\alpha_j$ for threshold evaluation.

Figure 4:
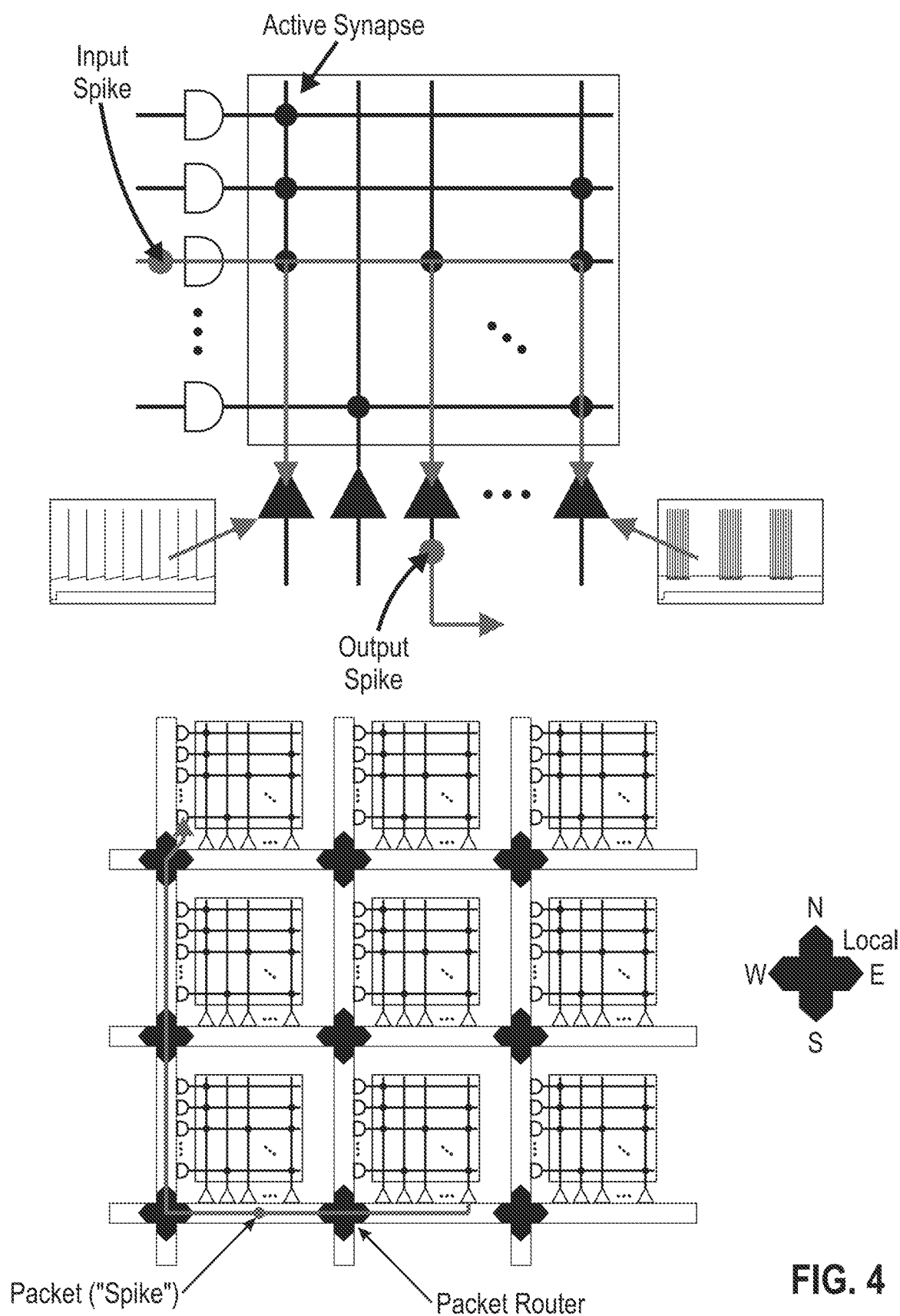
FIG. 4 depicts a neuron with stochastic modes for synapses, leak, and thresholds, sending a spike to a different core, in accordance with one embodiment.

For spike firing, if $V_j(t) \geq \alpha_j$, the neuron "fires" or injects a spike into the network, bound for its destination axon, possibly in a different core, as shown according to one embodiment in FIG. 4. Note that if $V_j(t)$ does not reach its threshold, it will not spike and the destination will not receive the signal.

After firing a spike, the neuron resets $V_j(t)$ to a starting value for the next tick. The starting value may be configurable, either through administrator manipulation, or via a machine learning routine that provides for an automatic starting value, such as 0 mV. In addition, the neuron also supports stochastic modes for synapses, leak, and thresholds.

Notice that in the neuron equation shown in FIG. 3, $\eta_j = \rho_j^T \& M_j$ denotes the logical AND of a random number generator $\rho_j^T$ with the first $M_j$ bits of its binary representation. In other words for $M_j=8$ this returns a random 8 bit number in 0-255 and for $M_j=0$, $\eta_j$ is always zero (i.e., it is not random), for the stochastic rate store neuron described herein according to one embodiment.

Figure 5A:
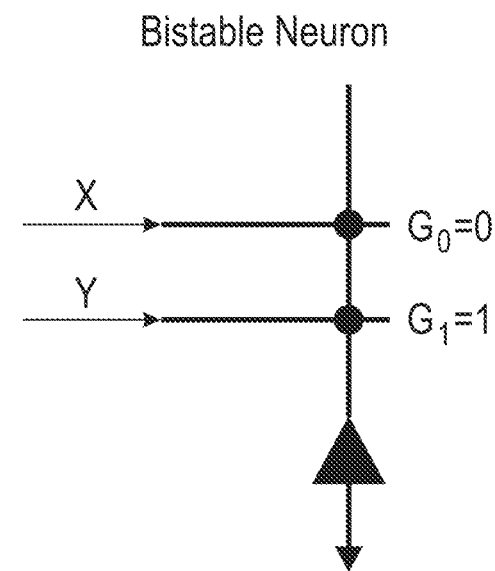
FIG. 5A shows a block diagram of a bistable neuron, in accordance with one embodiment.

Now referring to FIG. 5A, a bistable neuron structure is shown according to one embodiment. As shown, the bistable neuron has two stable states, which are attainable through input axons X and Y, of type $G_0=0$ and $G_1=1$. The two stable states are referred to as waiting (no spike output) and bursting (spiking output). A spike input along input axon X starts the bursting behavior to set the bistable neuron into the bursting state, with the number of spikes per second being controlled, in one embodiment, by the value of the positive threshold and the weights assigned per the neuron equation shown in FIG. 3. Referring again to FIG. 5A, a spike along input axon Y stops the bursting behavior to set the bistable neuron into the waiting state. Thus, the bistable neuron uses a burst representation to indicate the last binary input along axon X.

Figure 5B:
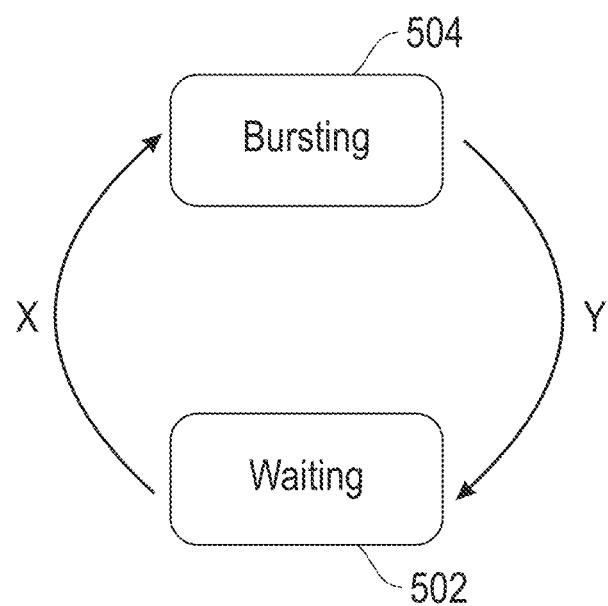
FIG. 5B shows operation of a bistable neuron, in accordance with one embodiment.

Now referring to FIG. 5B, operation of the bistable neuron is described in accordance with one embodiment. As previously described, the bistable neuron has a waiting state 502 and a bursting state 504. When a bistable neuron is outputting spikes, as described previously, it is assumed to currently be storing a value of 1. When it is not outputting spikes, it is assumed to store a value of 0. By sending a control spike along the Y axon and/or the X axon, it is possible to clear the memory to 0 and to set it to a value of 1. Specifically, sending a control spike along axon Y clears the memory to 0, in one embodiment. Moreover, sending a control spike along axon X sets the memory to a value of 1, in one embodiment.

Table 1 reflects the operations that may be performed using the bistable neuron: write information, store information, and read information, along with the description of the action that takes place in order to accomplish the corresponding method.

TABLE 1

| Method | Description |
|---|---|
| Write | Send an input Y to write a 0 to the memory (clear). |
|  | Send an input X to write a 1 to the memory (set). |
| Store | If the neuron is in the BURSTING state, it is storing a '1.' |
|  | If the neuron is in the WAITING state, it is storing a '0.' |
| Read | If the neuron is spiking, a '1' is stored. |
|  | If the neuron is not spiking, a '0' is stored. |

Figure 5C:
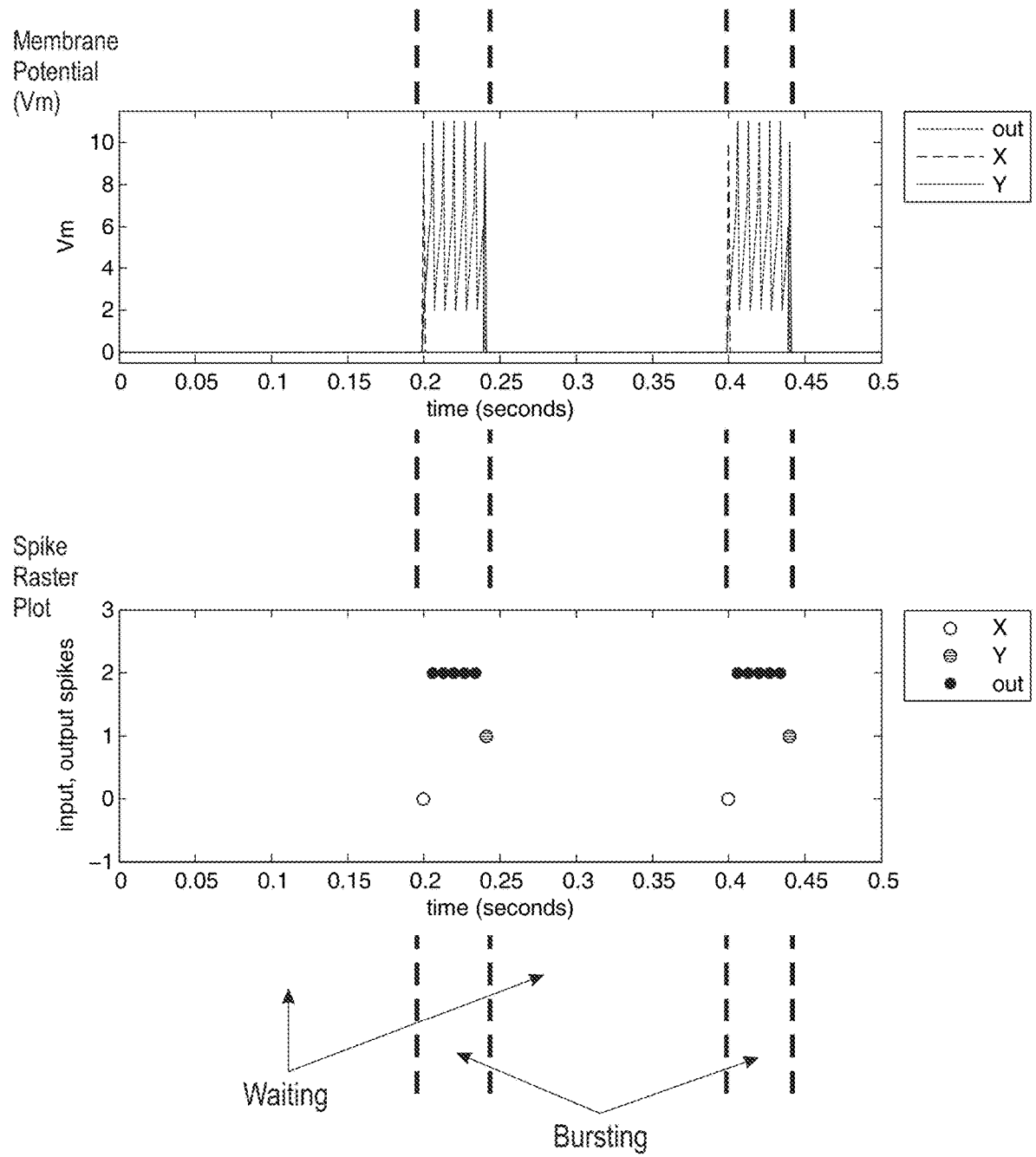
FIG. 5C shows plots of a bistable neuron in operation according to one embodiment.

With reference to FIG. 5C, plots are shown of the bistable neuron's membrane potential, Vm, as it is bursting output spikes (representing a stored value of 1) and as the membrane potential has a value of 0 when no output spikes are generated (representing a stored value of 0). Of course, the values represented by these plots are representative only, and actual potentials and spike frequencies may vary according to application and/or environment.

The bistable neuron described in FIGS. 5A-5C may be used in any brain-inspired processor to store and retrieve information, according to one embodiment. In addition, the bistable neuron, in one embodiment, may be implemented in the neuron equation shown in FIG. 3 using the following parameters defining each neuron j. Unless otherwise specified a delay of 1 is associated with each neuron, denoting the number of ticks it takes for a spike to arrive at its destination axon:

$[s_j^0, s_j^1, s_j^2, s_j^3] = [1, -9, 0, 0]$
$\alpha_j = 8$
$\lambda_j = 1$
$\varepsilon_j = 1$
$\beta_j = 0$
$\kappa_j = 1$
$\gamma_j = 0$
$R_j = 1$
$c_j = 0$
$M_j = 0$
$[b_j^0, b_j^1, b_j^2, b_j^3] = [0, 0, 0, 0]$
$V_j(0) = 0$ (Initial membrane potential)

Figure 6A:
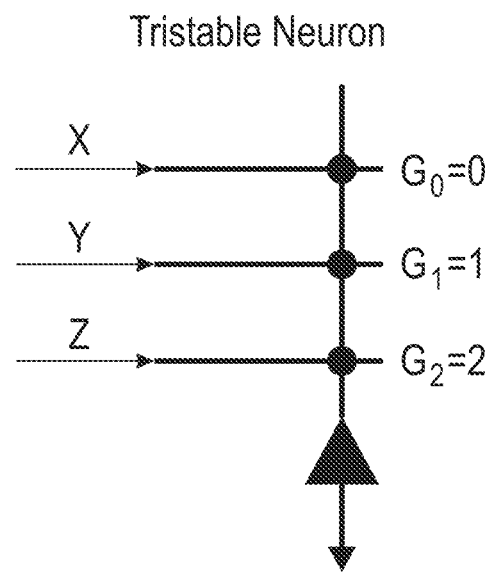
FIG. 6A shows a block diagram of a tristable neuron, in accordance with one embodiment.

Now referring to FIG. 6A, a tristable neuron structure is shown according to one embodiment. The tristable neuron is similar to the bistable neuron, but it has three stable states instead of two stable states, as in the bistable neuron. As shown, the tristable neuron's three stable states are bursting (spiking output), off (not spiking output and restricted from proceeding to the bursting state), and waiting (no spiking output and capable of proceeding to the bursting state), which are attainable through input axons X, Y, and Z, respectively.

Figure 6B:
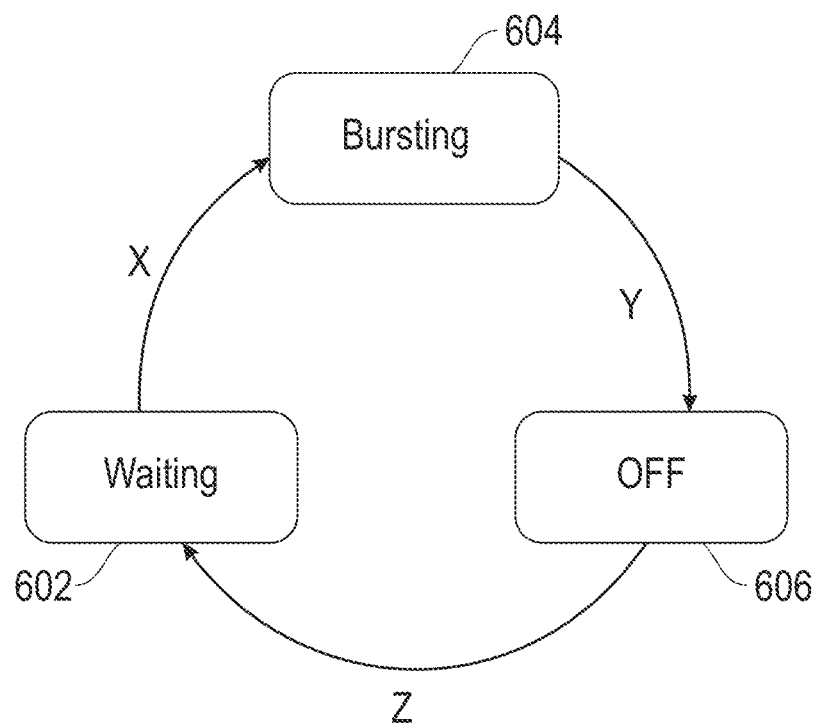
FIG. 6B shows operation of a tristable neuron, in accordance with one embodiment.

Now referring to FIG. 6B, operation of the tristable neuron is described in accordance with one embodiment. As previously described, the tristable neuron has a waiting state 602, a bursting state 604, and an off state 606. When a tristable neuron is outputting spikes, as described previously, it is assumed to currently be storing a value of 1. When it is not outputting spikes, it is assumed to store a value of 0. The third state indicates that the tristable neuron is in the off state and must be transitioned to the waiting state prior to storing information.

A spike along input axon X starts the bursting behavior to set the tristable neuron into the bursting state from the waiting state, with the number of spikes per second being controlled, in one embodiment, by the value of the positive threshold alpha and the synaptic weights assigned per the neuron equation shown in FIG. 3. Referring again to FIG. 6B, a spike along input axon Y stops the bursting behavior to set the tristable neuron into the off state, thus guaranteeing no output from the tristable neuron even when provided a spike along input axon X. A spike along the input axon Z sets the tristable neuron to the waiting state so that given a spike along the input axon X, the bursting behavior will begin. Thus, the tristable neuron uses a burst representation to indicate the last binary X input, with the proviso that the tristable neuron was previously in the waiting state.

In other words, in order to store a new value in the tristable neuron, a single spike is sent along the input axon Y to clear the tristable neuron and transition it to the off state. At this point, the tristable neuron is storing a value of '0.' To set the tristable neuron to a value of '1,' two actions are performed: a single spike is sent along input axon Z to set the tristable neuron to the waiting state; then, a single spike is sent along the input axon X to initiate the bursting state, representing the value of '1.'

Table 2 reflects the operations that may be performed using the tristable neuron: write information, store information, and read information, along with the description of the action that takes place in order to accomplish the corresponding method.

TABLE 2

| Method | Description |
|---|---|
| Write | Send an input Y to write a 0 to the memory (clear and disable). |
|  | Send an input Z to enable the memory. |
|  | Send an input X to write a 1 to the memory (set). |
| Store | If the neuron is in the BURSTING state, it is storing a '1.' |
|  | If the neuron is in the WAITING state, it is storing a '0.' |
| Read | If the neuron is spiking, a '1' is stored. |
|  | If the neuron is not spiking, a '0' is stored. |

Figure 6C:
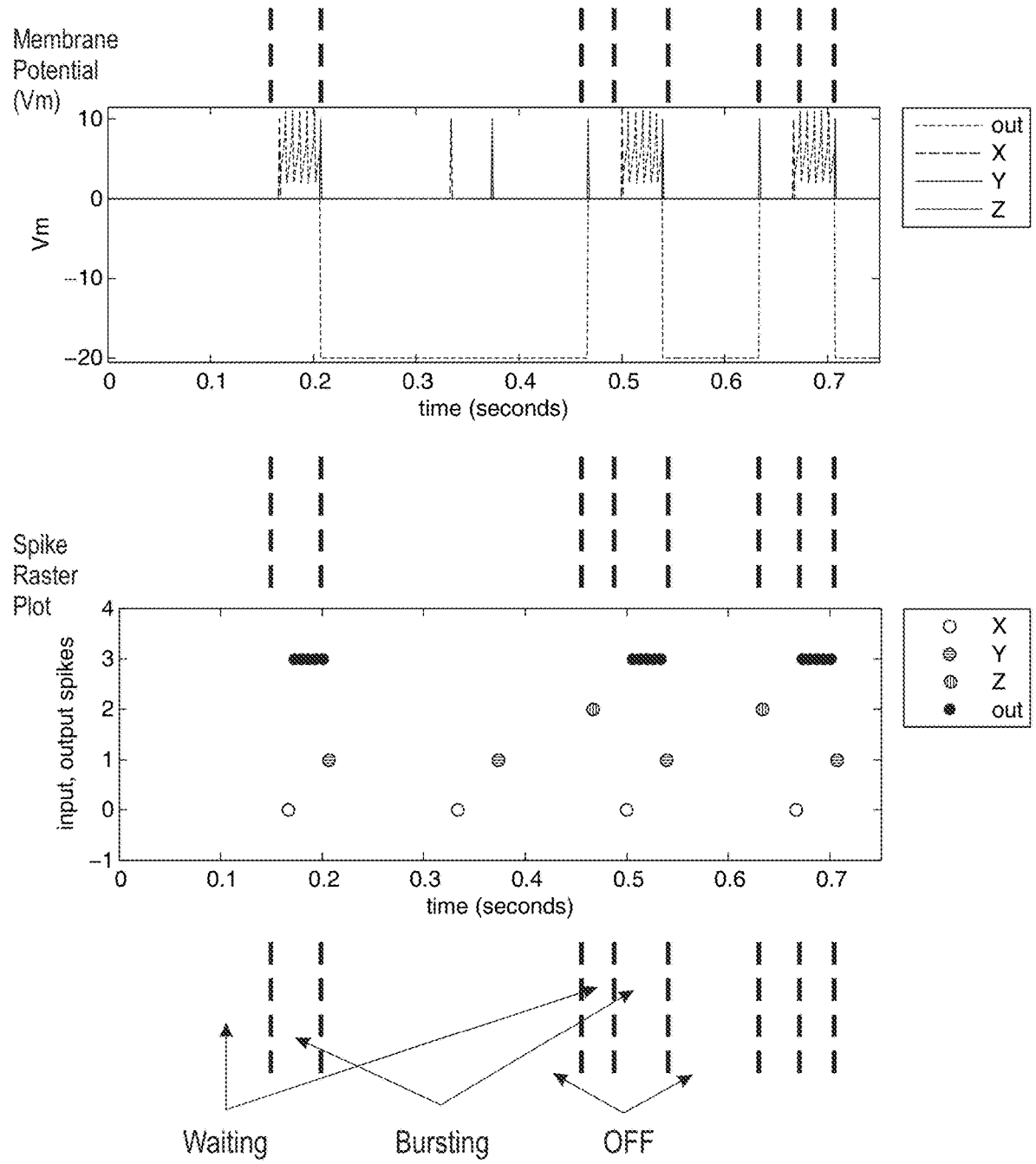
FIG. 6C shows plots of a tristable neuron in operation according to one embodiment.

With reference to FIG. 6C, plots are shown of the tristable neuron's membrane potential, Vm, as it is bursting output spikes (representing a stored value of 1) and as the membrane potential has a value of 0 when no output spikes are generated (representing a stored value of 0). Of course, the values represented by these plots are representative only, and actual potentials and spike frequencies may vary according to application and/or environment.

The tristable neuron described in FIGS. 6A-6C may be used in any brain-inspired processor to store and retrieve information, according to one embodiment. In addition, the tristable neuron, in one embodiment, may be implemented in the neuron equation shown in FIG. 3 using the following parameters defining each neuron j. Unless otherwise specified a delay of 1 is associated with each neuron:

$[s_j^0, s_j^1, s_j^2, s_j^3] = [1, -28, 20, 0]$
$\alpha_j = 8$
$\lambda_j = 1$
$\varepsilon_j = 1$
$\beta_j = 20$ $\kappa_j=1$
$\gamma_j=0$
$R_j=1$
$c_j=0$
$M_j=0$
$[b_j^0, b_j^1, b_j^2, b_j^3]=[0,0,0,0]$
$V_j(0)=0$ (Initial membrane potential)

Note that in this example, an alpha value of 8 is used which implies that during bursting, the tristable neuron sends one spike every 8 ticks. By adjusting this value, it is possible to control the burst frequency with which output spikes are created to denote a stored value of '1.'

Figure 7A:
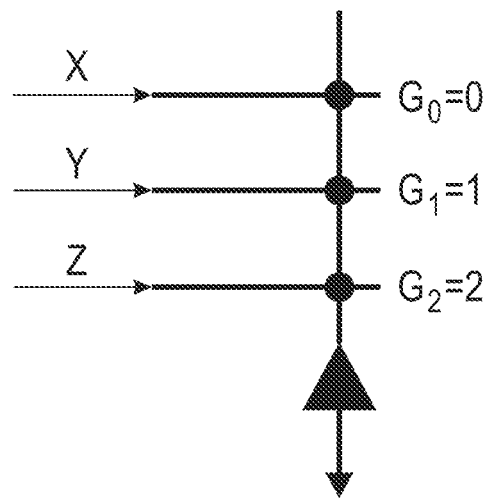
FIG. 7A shows a block diagram of a binary pass gate neuron, in accordance with one embodiment.

Now referring to FIG. 7A, a binary pass gate neuron is described according to one embodiment. The binary pass gate neuron has three input axons: X, Y, and Z.

Figure 7B:
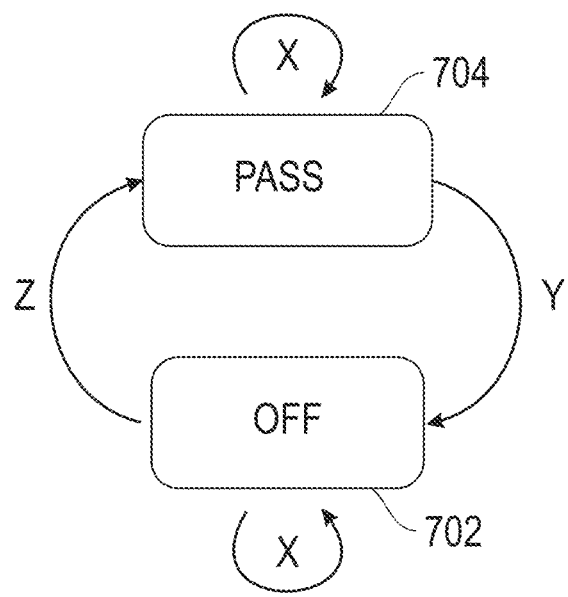
FIG. 7B shows operation of a binary pass gate neuron, in accordance with one embodiment.

With reference to FIG. 7B, the binary pass gate neuron enables the gating of binary input spikes by having two modifiable states, the off state 702 and the pass state 704. When in the off state, it is guaranteed that no matter how many spikes enter via input axon X, the binary pass gate neuron will not output any spikes. Conversely, when the binary pass gate neuron is in the pass state, any spike entering via the input axon X will also be duplicated and output by the binary pass gate neuron. Spikes via the input axons Y and Z send the binary pass gate neuron to the off state and the pass state, respectively.

In other words, when the binary pass gate neuron is in the off state, it will not spike even when it receives input and will stay off. Also, when the binary pass gate neuron is in the pass state, it will spike when it receives input and then remain in the pass state. A spike along the input axon X in the pass state triggers spiking behavior. A spike along the input axon X in the off state has no effect. A spike along the input axon Y sends the binary pass gate neuron into the off state from the pass state. A spike along the input axon Z sends the binary pass gate neuron into the pass state from the off state.

This binary pass gate neuron may be attached to any of the neurons described herein, in one embodiment, such as a bistable neuron, a tristable neuron, etc., to ensure that output spikes are provided only in response to desired probing of the neurons for their stored value (otherwise it is possible for these neurons to fire continuously when storing a certain value, which increases the active power of the system, which is undesirable). Thus, this binary pass gate neuron may be implicitly seen as accompanying many of the memory neurons described in various embodiments.

Alternatively, in other embodiments, the binary pass gate neuron may be a memory storage device itself, where the off state stores a value of 0 and the pass state stores a value of 1. To determine the state of the binary pass gate neuron, a single probe spike may be sent along the input axon X, and if the neuron also outputs a spike (indicating the pass state), then the binary pass gate neuron was storing a value of 1, otherwise the neuron was storing a value of 0.

Table 3 reflects the operations that may be performed using the binary pass gate neuron: write information, store information, and read information, along with the description of the action that takes place in order to accomplish the corresponding method.

TABLE 3

| Method | Description |
| --- | --- |
| Write | Send an input Y to write a 0 to the memory (clear). Send an input Z to write a 1 to the memory (set). |

TABLE 3-continued

| Method | Description |
| --- | --- |
| Store | If the neuron is in the PASS state, it is storing a '1.' If the neuron is in the OFF state, it is storing a '0.' |
| Read | Send an X input. If a spike is returned (output), a 1 is stored. If no spike is returned (output), a 0 is stored. |

Figure 7C:
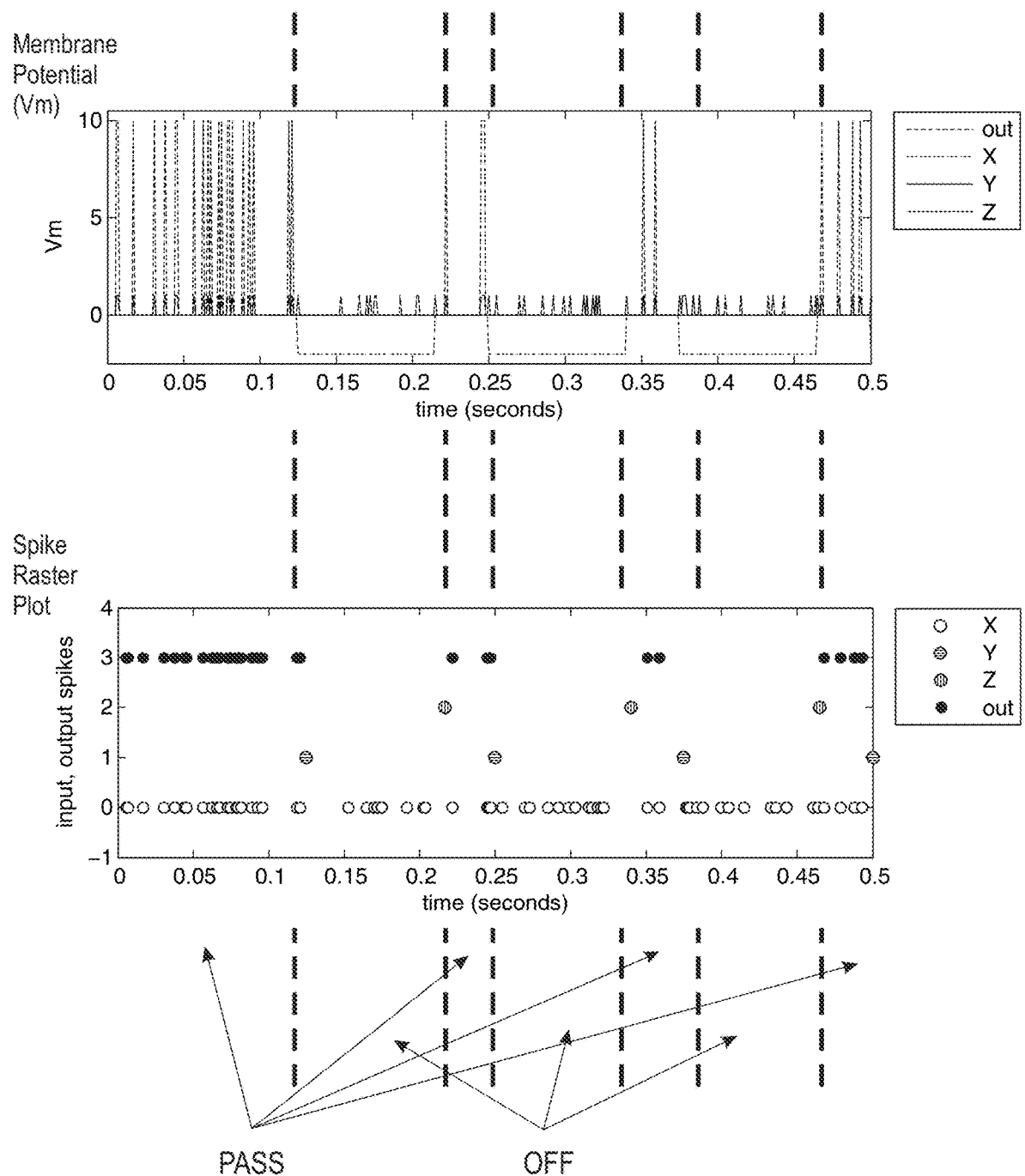
FIG. 7C shows plots of a binary pass gate neuron in operation according to one embodiment.

With reference to FIG. 7C, plots are shown of the binary pass gate neuron's membrane potential, Vm, as it is bursts an output spike upon probing (representing a stored value of 1) and as the membrane potential has a value of 0 when no output spikes are generated (representing a stored value of 0). Of course, the values represented by these plots are representative only, and actual potentials and spike frequencies may vary according to application and/or environment.

The binary pass gate neuron described in FIGS. 7A-7C may be used in any brain-inspired processor to store and retrieve information, according to one embodiment. In addition, the binary pass gate neuron, in one embodiment, may be implemented in the neuron equation shown in FIG. 3 using the following parameters defining each neuron j. Unless otherwise specified a delay of 1 is associated with each neuron:

$[s_j^0, s_j^1, s_j^2, s_j^3]=[1,-200,2,0]$
$\alpha_j=1$
$\lambda_j=1$
$\varepsilon_j=1$
$\beta_j=2$
$\kappa_j=1$
$\gamma_j=0$
$R_j=0$
$c_j=0$
$M_j=0$
$[b_j^0, b_j^1, b_j^2, b_j^3]=[0,0,0,0]$
$V_j(0)=0$ (Initial membrane potential)

According to more embodiments, structures for storing, accessing, and resetting data, referred to as a short-term memory corelets, may be used in a brain-inspired processor-based environment. Each corelet is configured to operate with either or both of binary-coded data and rate-coded data. A more detailed description of the corelet programming environment is provided in Arnon Amir et al., "Cognitive computing programming paradigm: A corelet language for composing networks of neurosynaptic cores," Proceedings of the IEEE International Joint Conference on Neural Networks 2013.

In one embodiment, a corelet may have one set of input axons and two sets of control axons. The first set of control axons is referred to as a reset control axons. A single spike sent through the set of reset control axons resets/clears the memory. The set of input axons is used to input the binary or rate coded data that is to be stored. After resetting the corelet, the binary/rate code to be stored may be entered via the input axons.

The second set of control axons is referred to as probing control axons. Each time a single input spike enters the corelet through the set of probing control axons, the stored input sequence is reproduced in the output. The probing may be applied an arbitrary number of times for any stored information.

Figure 8A:
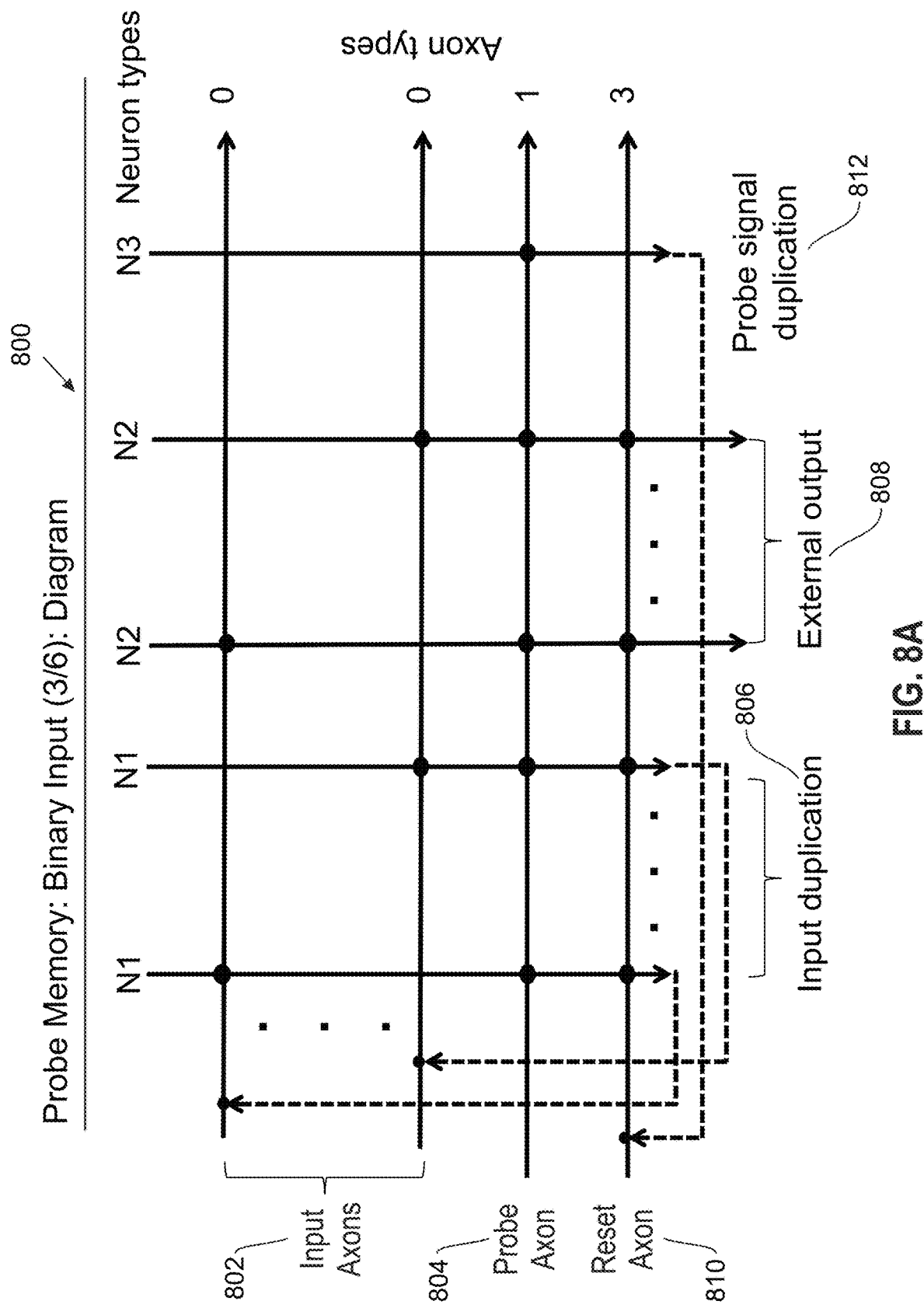
FIG. 8A shows a block diagram of a binary input probe memory, in accordance with one embodiment.

Referring now to FIG. 8A, a probe memory 800 for binary inputs is shown according to one embodiment. The probe memory 800 for binary inputs may operate as described hereafter in one embodiment.

The routine may store a binary string of length n. For example, for n=4, a value of 0110 may be stored. This is accomplished by initializing the corelet/routine to use 4 input axons 802. Initially, the routine holds a value of 0000. Then, a single spike is sent along the second and third input axons. This makes neuron types N1 and N2 store two copies of the binary string 0110. Then, to read the stored value, a single spike is sent along the probe axon 804. This causes the second and third of the neurons, e.g., the second and third input duplication neurons 806 and the second and third external output neurons 808 to output a spike.

The spikes sent along the external output neurons 808 are sent to an external device that had sought access to the memory contents. The spikes sent along the input duplication neurons 806 are sent back to their respective input axons 802 recursively, thus effectively resetting the neuron to an initial value.

Notice, however that before these spikes are sent recursively back to the input axons 802, the neurons N1 and N2 are reset. To reset the N1 and N2 neurons, the spike sent along the probe axon 804 is duplicated at neuron N3 and sent to the reset axon 810 which resets the neurons to 0. Then, at the next tick, the spikes sent along the input duplication neurons 806 may re-enter the input axons 802 to set the neurons to store 0110. As a result, the input duplication/N1 neurons have a slightly greater delay associated with them than the external output/N2 neurons, in order to make sure that the duplicated spikes arrive after the reset pulse has taken effect. A user may also send a single spike along the reset axon 810 to reset the memory cell.

Through the input axons 802 the set of binary inputs that will store the data are entered. For example, to store an ordered set of n binary values, n input axons 802 are used. In FIG. 8A, two input axons 802 are shown, where each input axon 802 is connected to two input duplication neurons 806 (of type N1) and two external output neurons 808 (of type N2) via synapses denoted by the black circles where the lines intersect. Each black circle indicates a synapse, and where a black circle is not present at an intersection, then a synapse does not exist and the lines functionally are not connected.

A single spike sent through the probe axon 804 causes each of the external output neurons 808 and each of the input duplication neurons 806 to spike, once, in response to storing a single input spike, as denoted by the synapses at the intersection between the probe axon 804 and each of the neurons of types N1 and N2. Also, the spike sent along the probe axon 804 is duplicated by the probe signal duplication neuron 812 (of type N3).

The input duplication neurons 806 are recursively connected to the input axons 802, such as via a BUSOR indicated by the dotted lines connecting back to the black circles prior to the neurons of type N1 on each of the input axons 802. This causes the reinitialization of the neurons of types N1, N2, etc., to their previous state before the probing.

To store a different value, a reset pulse is sent through the reset axon 810 which resets the storage neurons of types N1, N2, etc. The next input may then be stored in those neurons. Notice that the probe duplication neuron 812 (of type N3) is connected to the reset axon 810, such as via a BUSOR indicated by the dotted line connecting back to the black circle prior to the neurons of type N1 on the reset axon 810. This causes a resetting of the neurons of types N1, N2, etc., after the probing so that the input duplication neurons 806 are allowed to set the storage neurons of types N1, N2, etc., to a proper state corresponding to the different value to be stored therein.

Figure 8B:
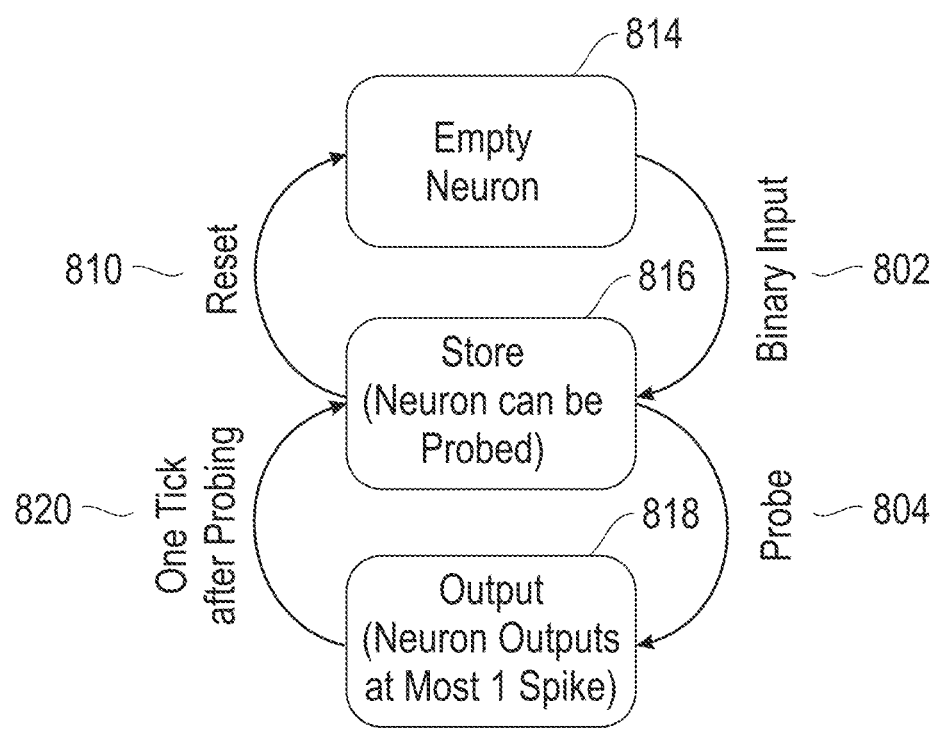
FIG. 8B shows operation of a binary input probe memory, in accordance with one embodiment.

With reference to FIG. 8B, operation of the probe memory is described in accordance with one embodiment. The probe memory, for each neuron therein, may be in three different states: an empty neuron state 814, a store state 816, and an output state 818. In the empty neuron state 814, the neuron is empty and has no value stored therein. From this state, the neuron may only proceed into the store state 816. The neuron may be placed into the store state 816 via the binary input axon 802, and it may be placed back into the empty neuron state 814 from the store state 816 via the reset axon 810.

In the store state 816, the neuron is storing a value, and is in a state which may be probed to discover that value. From this state, the neuron may proceed into the empty neuron state 814 and into the output state 818. The neuron may be placed into the empty neuron state 814 via the reset axon 810, and it may be placed into the output state 818 via probing through the probe axon 804. When in the output state 818, the neuron spikes at most one spike. One tick after probing causes the spike output, the neuron returns 820 to the store state 816.

Table 4 reflects the operations that may be performed using the binary input probe memory: write information, store information, read information, and reset the neurons, along with the description of the action that takes place in order to accomplish the corresponding method.

TABLE 4

| Method | Description |
| --- | --- |
| Write | 1. Send a single spike along the reset axon to set all neurons to a value of 0.<br>2. Send to the input axons the binary data to be stored. A single input spike to store a "1," no input spikes to store a "0." |
| Store | Each neuron encodes a value of either 0 or 1. An output neuron may only spike in response to a spike entering the probe axon and the corresponding neuron storing a value of 1. The membrane potential of the neuron encodes the binary value stored. |
| Read | Send a single spike along the probe axon. Each external output neuron fires a single spike in response to a single spike having entered along its corresponding input axon during "write," denoting that the value 1 is stored in the neuron. |
| Reset | Send a single spike along the reset axon to cause all neurons to encode the value zero. |

Figure 8C:
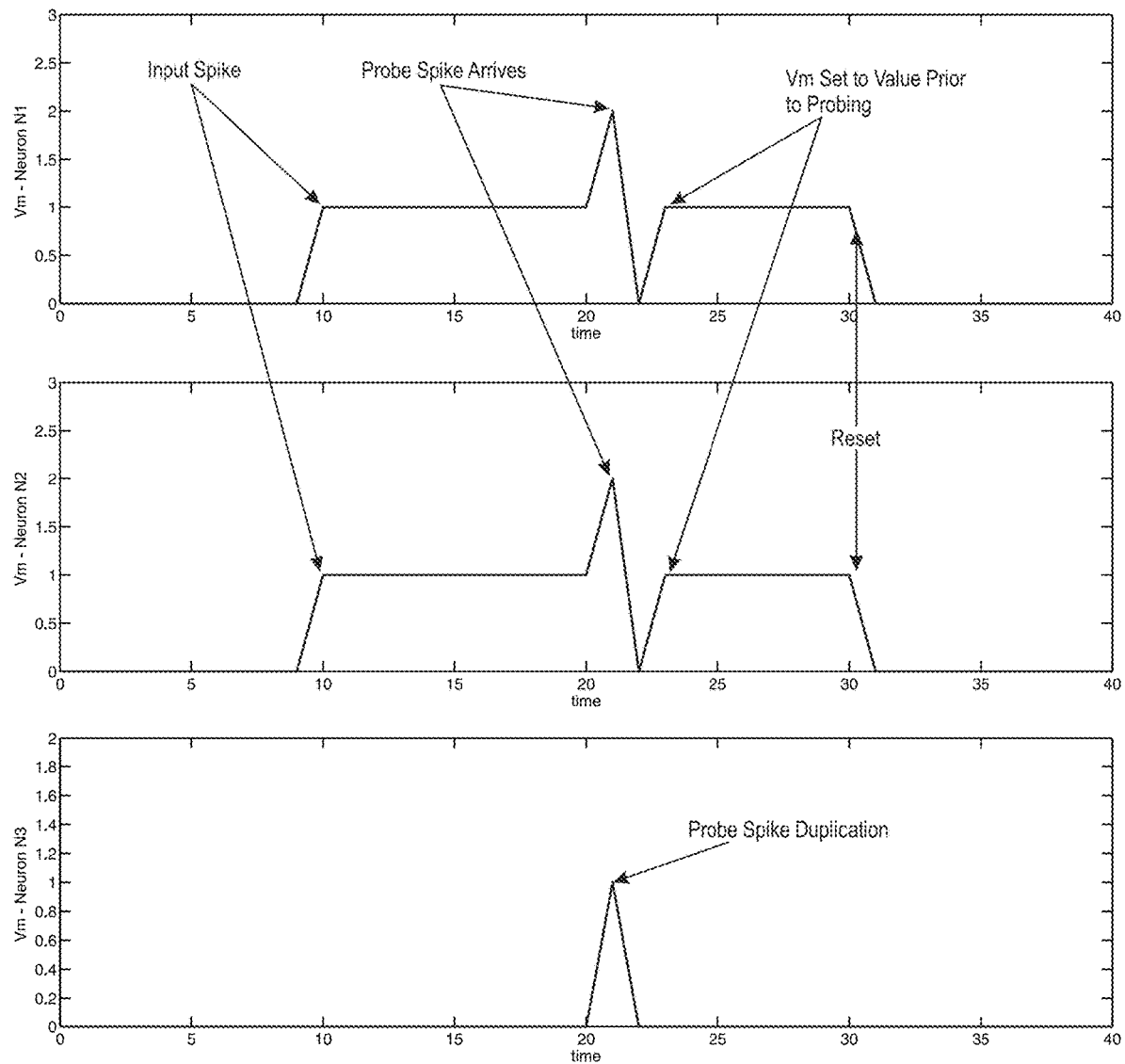
FIG. 8C shows plots of a binary input probe memory in operation according to one embodiment.

With reference to FIG. 8C, plots are shown of the binary input probe memory's various neuron membrane potentials, Vm, as they burst an output spike upon probing (representing a stored value of 1) and as the membrane potentials have a value of 0 when no output spikes are generated (representing a stored value of 0). Of course, the values represented by these plots are representative only, and actual potentials and spike frequencies may vary according to application and/or environment.

The binary input probe memory described in FIGS. 8A-8C may be used in any brain-inspired processor to store and retrieve information, according to one embodiment. In addition, the various components of the binary input probe memory, in one embodiment, may be implemented in the neuron equation shown in FIG. 3 using the following parameters for neurons of types N1, N2, and N3. Of course, when more neuron and neuron types are used, the parameters may be adjusted to account for the delays and other parameters changes that will allow for implementation in such structures.

For Neuron j of Type N1:
$[s_j^0, s_j^1, s_j^2, s_j^3] = [1,1,0,-255]$
$\alpha_j = 2$ $\lambda_j=0$
$\varepsilon_j=0$
$\beta_j=0$
$\kappa_j=1$
$\gamma_j=0$
$R_j=0$
$c_j=0$
$M_j=0$
$[b_j^0, b_j^1, b_j^2, b_j^3]=[0,0,0,0]$
$V_j(0)=0$ (Initial membrane potential)
delay=2 (the delay associated with each neuron of type N1)

For Neuron j of Type N2:
$[s_j^0, s_j^1, s_j^2, s_j^3]=[1,1,0,-255]$
$\alpha_j=2$
$\lambda_j=0$
$\varepsilon_j=0$
$\beta_j=0$
$\kappa_j=1$
$\gamma_j=0$
$R_j=0$
$c_j=0$
$M_j=0$
$[b_j^0, b_j^1, b_j^2, b_j^3]=[0,0,0,0]$
$V_j(0)=0$ (Initial membrane potential)
delay=1 (the delay associated with each neuron of type N2)

For Neuron j of Type N3:
$[s_j^0, s_j^1, s_j^2, s_j^3]=[1,1,1,1]$
$\alpha_j=1$
$\lambda_j=0$
$\varepsilon_j=0$
$\beta_j=0$
$\kappa_j=1$
$\gamma_j=0$
$R_j=0$
$c_j=0$
$M_j=0$
$[b_j^0, b_j^1, b_j^2, b_j^3]=[0,0,0,0]$
$V_j(0)=0$ (Initial membrane potential)
delay=1 (the delay associated with each neuron of type N3)

Figure 9A:
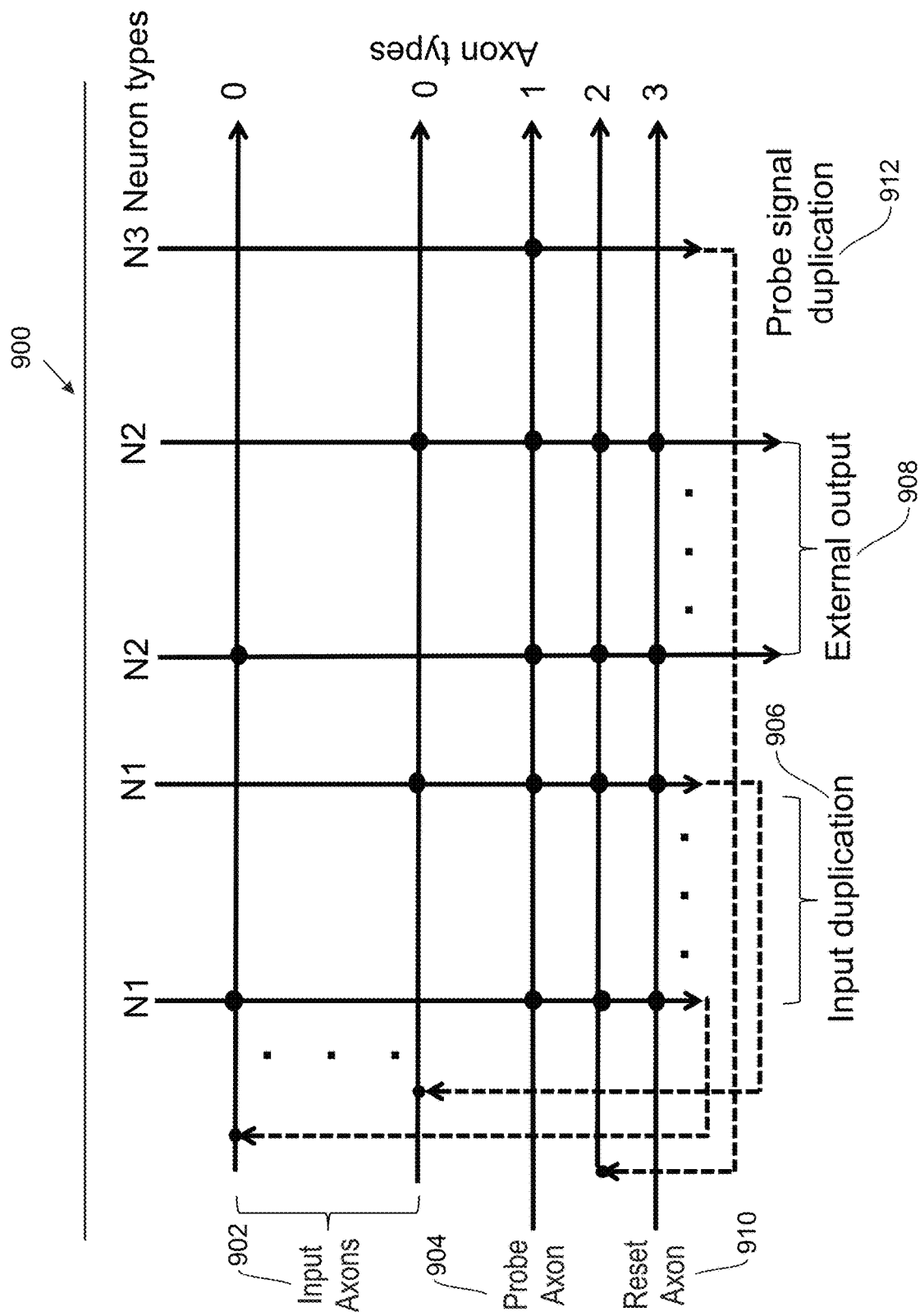
FIG. 9A shows a block diagram of a rate-coded input probe memory, in accordance with one embodiment.

Referring now to FIG. 9A, a probe memory 900 for rate-coded inputs is shown according to one embodiment. The probe memory 900 for rate-coded inputs is similar to the probe memory for binary-coded inputs described previously, and may operate as described hereafter in one embodiment.

A main difference between each probe memory is that each one of the input axons 902 of the probe memory 900 for rate-coded inputs takes, as input, a sequence of spikes numbering up to a maximum number of spikes (max Spikes) over a maximum ticks interval (i.e., a rate input instead of a binary input), referred to hereafter as a pulse. As a result, another one of the differences is that the probe memory 900 for rate-coded inputs outputs rate-coded outputs from the external output neurons 908, and the input duplication neurons 906 have a greater delay then those used in the binary-coded probe memory.

When a spike is sent along the probe axon 904, a copy of this probe spike is made using the probe signal duplication neuron 912 (of type N3), and this copy of the spike is sent along one of the reset axons 910. The two last axons are reset axons 910 but of different axon types (2 vs. 3). This arrangement is used because the axon type 2 is simply used to set the neuron to a −max Spikes membrane potential (in one embodiment, max Spikes ≤15, making it impossible to use a delay of 16 for the input duplication spikes). Also, recall that the maximum delay of a neuron is 15 without using extra delay neurons in one embodiment.

To reset the probe memory 900 for rate-coded inputs, a reset pulse is sent along the reset axon 910 of type 3 associated with all neurons. Note that the reset pulse is only effective in response to a neuron being in the store state or the empty state. In this way, there are no delayed spikes or pulses about to enter the input axons 902, otherwise unpredictable behavior may be possible.

Through the input axons 902, the set of rate coded inputs to be stored enter the rate-coded probe memory 900. For example, to store an ordered set of n rates with a maximum of max Spikes spikes per input, n input axons are used. In FIG. 9A, two input axons 902 are shown, where each input axon 902 is connected to one external output neuron 908 (N2) and one input duplication neuron 906 (N1), via synapses denoted by the black circles at intersections of the axons and neurons.

A single spike sent through the probe axon 904 causes the external output neurons 908 (N2) and input duplication neurons 906 (N1) to start spiking once per corresponding input spike, such as via synapses denoted by the black circles at intersections between the axons and neurons. Also, the probe spike sent along the probe axon 904 is duplicated via probe signal duplication neuron 912 (N3).

The input duplication neurons 906 are recursively connected to the input axons 902, such as via a BUSOR causing the reinitialization of the neurons N1, N2, etc., to their previous state before the probing. To allow a different value to be stored, a reset spike is sent through the reset axon 910 of type 3 which resets the storage neurons N1, N2, etc. The next input is stored in those neurons.

Notice that the probe duplication neuron 912 is connected to another reset axon 910 of type 2 which is not duplicated, and which causes a resetting of the neurons after the probing so that the input duplication neuron 906 output may set the storage neurons to the correct state.

For binary inputs, the reset axon 910 of type 2 is not used. The reset axon 910 of type 2 is used in the rate-coded inputs in order to re-initialize the neurons after each probe. A global decrement signal is sent via reset axon 910 of type 2 that decrements the potential by the amount it was previously incremented, and arrives along with the first recursive input. This is effective because at end of 15 spikes, all neurons will have a potential of 0. When the inputs have more than 15 spikes, extra delay neurons are added at the outputs of N1 and N3 type neurons in order to achieve the desired delay (which is more expensive time- and resource-wise). Also note that in this arrangement, a probe signal may be sent at most once every max Spikes ticks.

Figure 9B:
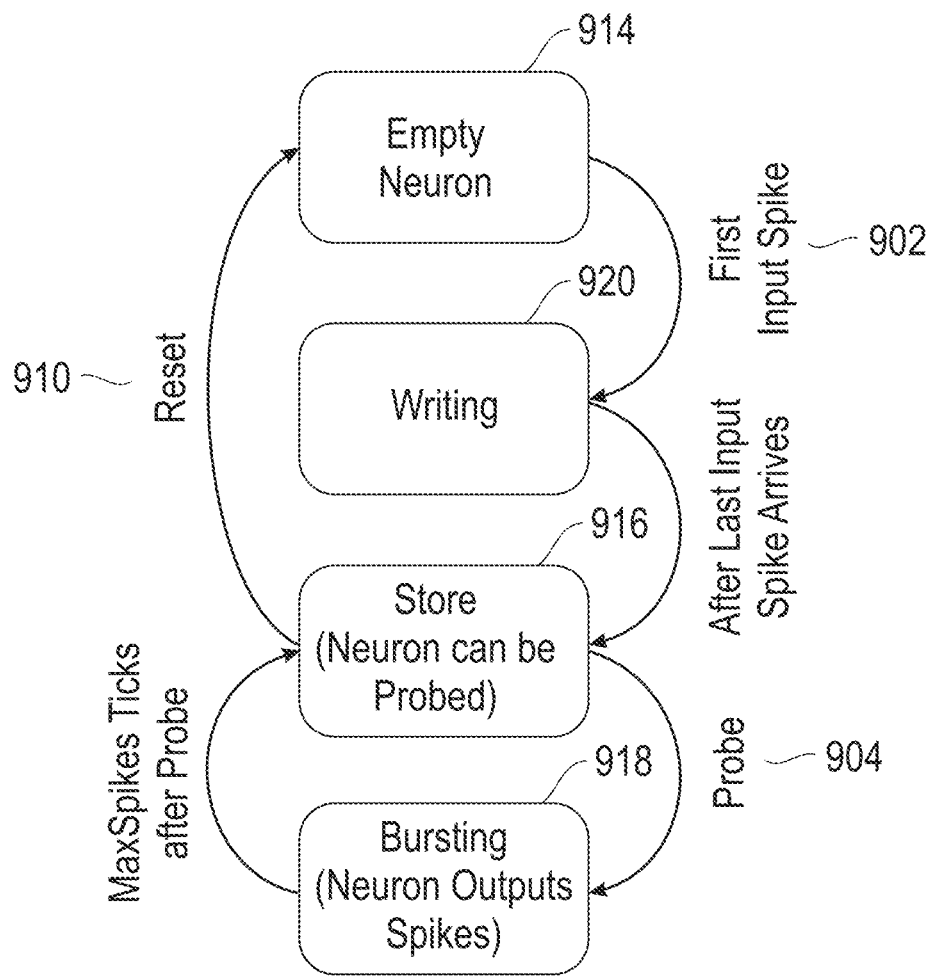
FIG. 9B shows operation of a rate-coded input probe memory, in accordance with one embodiment.

With reference to FIG. 9B, operation of the probe memory is described in accordance with one embodiment. The probe memory, for each neuron therein, may be in three different states: an empty neuron state 914, a store state 916, a writing state 920, and a bursting state 918. In the empty neuron state 914, the neuron is empty and has no value stored therein. From this state, the neuron may only proceed into the writing state 920. The neuron may be placed into the writing state 920 via a first input spike along an input axon 902.

A neuron stays in the writing state 920 until a last input spike arrives at the neuron, at which point the neuron transitions into the store state 916.

In the store state 916, the neuron is storing a value, and is in a state which may be probed to discover that value. From this state, the neuron may proceed into the empty neuron state 914 and into the bursting state 918. The neuron may be placed into the empty neuron state 914 via either of the reset axons 910 of type 2 or 3, and it may be placed into the bursting state 918 via probing through the probe axon 904. When in the bursting state 918, the neuron spikes a number of times that is less than the max Spikes, and returns to the store state 916 after a max Spikes ticks after receiving the probe signal.

Table 5 reflects the operations that may be performed using the rate-coded input probe memory: write information, store information, read information, and reset the neurons, along with the description of the action that takes place in order to accomplish the corresponding method.

TABLE 5

| Method | Description |
|---|---|
| Write | 1. Send a single spike along the reset axon to set all neurons to a value of 0.<br>2. Send to each input axon up to maxSpikes spikes, denoting the value to be stored. Any integer value may be stored in the set of integers [0, maxSpikes]. |
| Store | Each neuron encodes any integer value in [0, maxSpikes]. An output neuron may only spike in response to a spike entering the probe axon and the corresponding neuron storing a non-zero value. The membrane potential of the neuron encodes the value stored. |
| Read | Send a single spike along the probe axon. Each external output neuron fires a burst code where the number of spikes fires equals the value stored. At most, one read operation is permitted every maxSpikes ticks. |
| Reset | Send a single spike along the reset axon to cause all neurons to encode the value zero. |

Figure 9C:
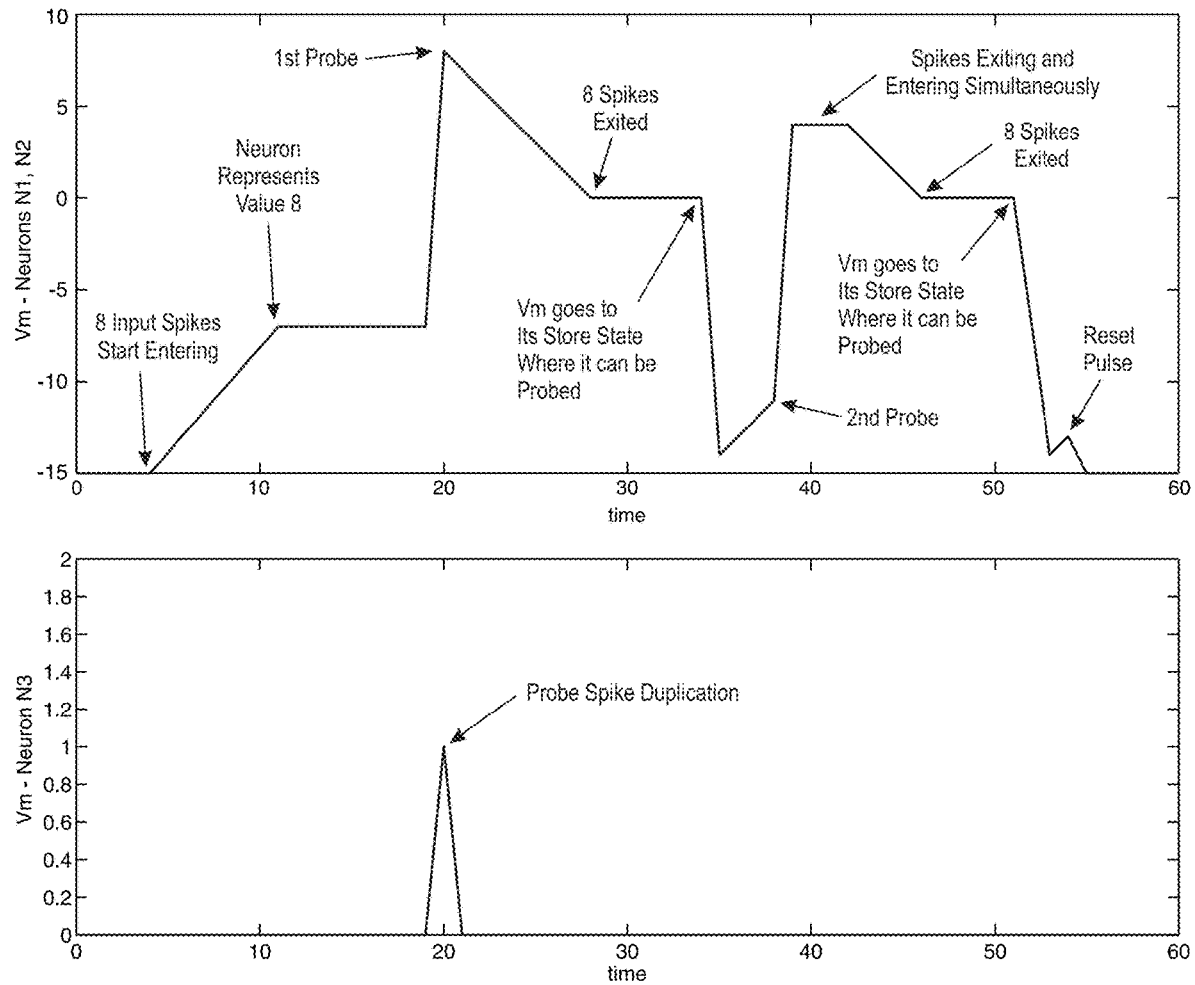
FIG. 9C shows plots of a rate-coded input probe memory in operation according to one embodiment.

With reference to FIG. 9C, plots are shown of the rate-coded input probe memory's various neuron membrane potentials, Vm, as they burst output pulses upon probing (with the number of spikes representing the stored value) and as the membrane potentials have a value of 0 when no output spikes are generated (representing a stored value of 0). In addition, the probe duplication axon output is also shown representing the duplication of the value stored in the neuron. Of course, the values represented by these plots are representative only, and actual potentials and spike frequencies may vary according to application and/or environment.

The rate-coded input probe memory described in FIGS. 9A-9C may be used in any brain-inspired processor to store and retrieve information, according to one embodiment. In addition, the various components of the rate-coded input probe memory, in one embodiment, may be implemented in the neuron equation shown in FIG. 3 using the following parameters for neuron N1, N2, and N3. Of course, when more neuron and neuron types are used, the parameters may be adjusted to account for the delays and other parameters changes that will allow for implementation in such structures.

For Neuron j of Type N1:
$[s_j^0, s_j^1, s_j^2, s_j^3]$=[1, max Spikes, −max Spikes, −255]
$\alpha_j=1$
$\lambda_j=0$
$\varepsilon_j=0$
$\beta_j$=max Spikes
$\kappa_j=1$
$\gamma_j=1$
$R_j=0$
$c_j=0$
$M_j=0$
$[b_j^0, b_j^1, b_j^2, b_j^3]$=[0,0,0,0]
$V_j(0)$=−max Spikes (Initial membrane potential)
delay=max Spikes (the delay associated with each neuron of type N1)

For Neuron j of Type N2:
$[s_j^0, s_j^1, s_j^2, s_j^3]$=[1, max Spikes, −max Spikes, −255]
$\alpha_j=1$
$\lambda_j=0$
$\varepsilon_j=0$
$\beta_j$=max Spikes
$\kappa_j=1$
$\gamma_j=1$
$R_j=0$
$c_j=0$
$M_j=0$
$[b_j^0, b_j^1, b_j^2, b_j^3]$=[0,0,0,0]
$V_j(0)$=−max Spikes (Initial membrane potential)
delay=1 (the delay associated with each neuron of type N2)

For Neuron j of Type N3:
$[s_j^0, s_j^1, s_j^2, s_j^3]$=[1,1,1,1]
$\alpha_j=1$
$\lambda_j=0$
$\varepsilon_j=0$
$\beta_j=0$
$\kappa_j=1$
$\gamma_j=0$
$R_j=0$
$c_j=0$
$M_j=0$
$[b_j^0, b_j^1, b_j^2, b_j^3]$=[0,0,0,0]
$V_j(0)=0$ (Initial membrane potential)
delay=max Spikes (the delay associated with each neuron of type N3. When max Spikes>15, extra delay neurons may be added to achieve the desired output delay)

Figure 10A:
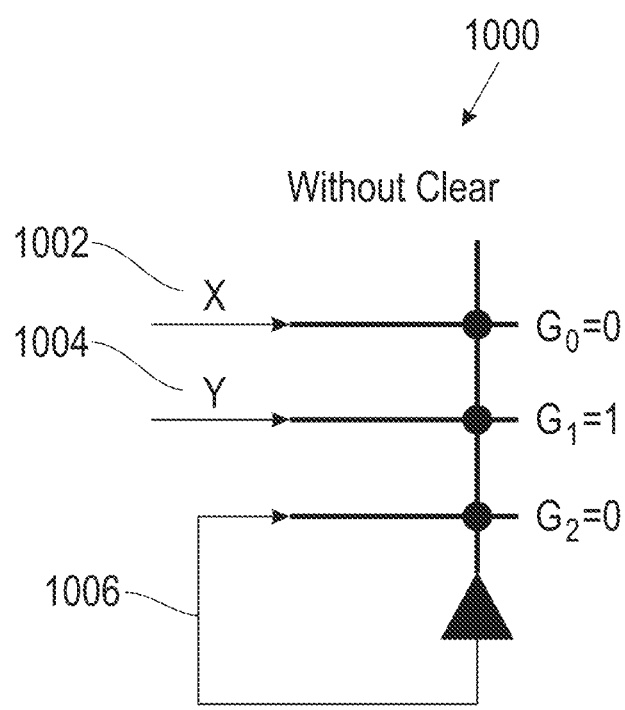
FIG. 10A shows a block diagram of a deterministic rate store (without clear), in accordance with one embodiment.

Referring now to FIG. 10A, a deterministic rate store neuron 1000 is shown according to one embodiment. The deterministic rate store neuron 1000 may act as a multi-valued memory, storing a spike rate. It stores the spike rate in the recurrent feedback connection. It deterministically fires spikes at a given rate until the feedback loop is modified. Excitatory and inhibitory synaptic input increases and decreases the number of spikes in the feedback loop. As shown, the deterministic rate store neuron 1000 does not have a clear function.

The number of possible rates that may be stored is determined by the delay buffer size in the feedback loop. The output rate is the number of input spikes divided by the number of delay slots in the feedback loop times 1 kHz (or some other value that is equal to the maximum firing rate). In one embodiment, a maximum axon delay of 15 ticks may be set. However, more or less maximum ticks delay may be utilized, as described previously. More timeslots can be added by adding additional delay neurons in the feedback loop (with up to 15 timeslots per delay neuron).

Given an input spike along input axon X 1002, the spike is guaranteed to be replicated and recursively sent back as an input into the deterministic rate store neuron 1000. The actual time it takes for the spike to arrive back recursively depends on the delay parameter associated with the deterministic rate store neuron 1000, and as a result this delay value affects the number of spikes per second that are able to be created for each single input spike (more spikes via axon X 1002 may also affect the output spike rate). In this way, the output rate of the deterministic rate store neuron 1000 represents the value stored in the deterministic rate store neuron 1000.

In order to decrement the output spike rate, a decrement control spike is sent through control axon Y 1004 at substantially the same time that the feedback spike enters via the feedback axon 1006. By substantially the same time, what is meant is that the two signals arrive within an undiscernible difference in time, such as less than 1 picosecond, less than 10 picoseconds, etc.

Table 6 reflects the operations that may be performed using the deterministic rate store neuron 1000: write information, store information, and read information, along with the description of the action that takes place in order to accomplish the corresponding method.

TABLE 6

| Method | Description |
|---|---|
| Write | Send excitatory input along input axon X to increase the value (rate) stored in the memory. Send inhibitory input along control axon Y to decrease the value (rate) stored in the memory. |
| Store | The multi-valued rate the neuron spikes is the value stored in the memory. |
| Read | The rate that the neuron spikes is the value stored in the memory (no explicit read required). |

Figure 10B:
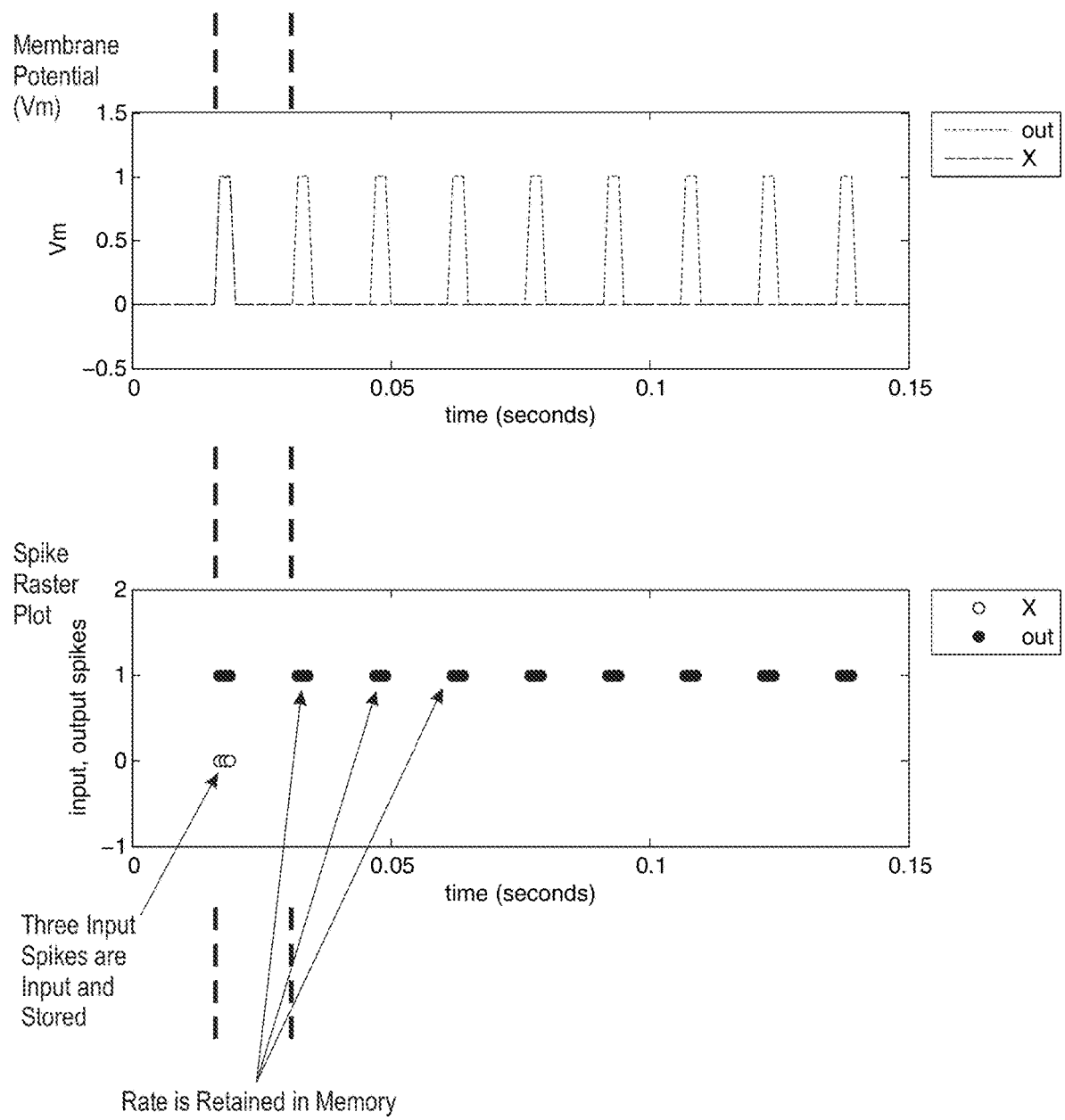
FIG. 10B shows plots of a deterministic rate store (without clear) in operation according to one embodiment.

With reference to FIG. 10B, plots are shown of the deterministic rate store neuron's membrane potential, Vm, in operation. In addition, the spike raster plot is also shown representing the value stored in the neuron. Of course, the values represented by these plots are representative only, and actual potentials and spike frequencies may vary according to application and/or environment.

The deterministic rate store neuron described in FIGS. 10A-10B may be used in any brain-inspired processor to store and retrieve information, according to one embodiment. In addition, the deterministic rate store neuron, in one embodiment, may be implemented in the neuron equation shown in FIG. 3 using the following parameters defining each neuron j. Of course, the parameters may be adjusted to account for the delays and other parameters changes that will allow for implementation in various structures.

$[s_j^0, s_j^1, s_j^2, s_j^3] = [1, -1, 0, 0]$
$\alpha_j = 1$
$\lambda_j = 0$
$\varepsilon_j = 1$
$\beta_j = 0$
$\kappa_j = 1$
$\gamma_j = 1$
$R_j = 0$
$c_j = 0$
$M_j = 0$
$[b_j^0, b_j^1, b_j^2, b_j^3] = [0,0,0,0]$
$V_j(0) = 0$ (Initial membrane potential)

Figure 11A:
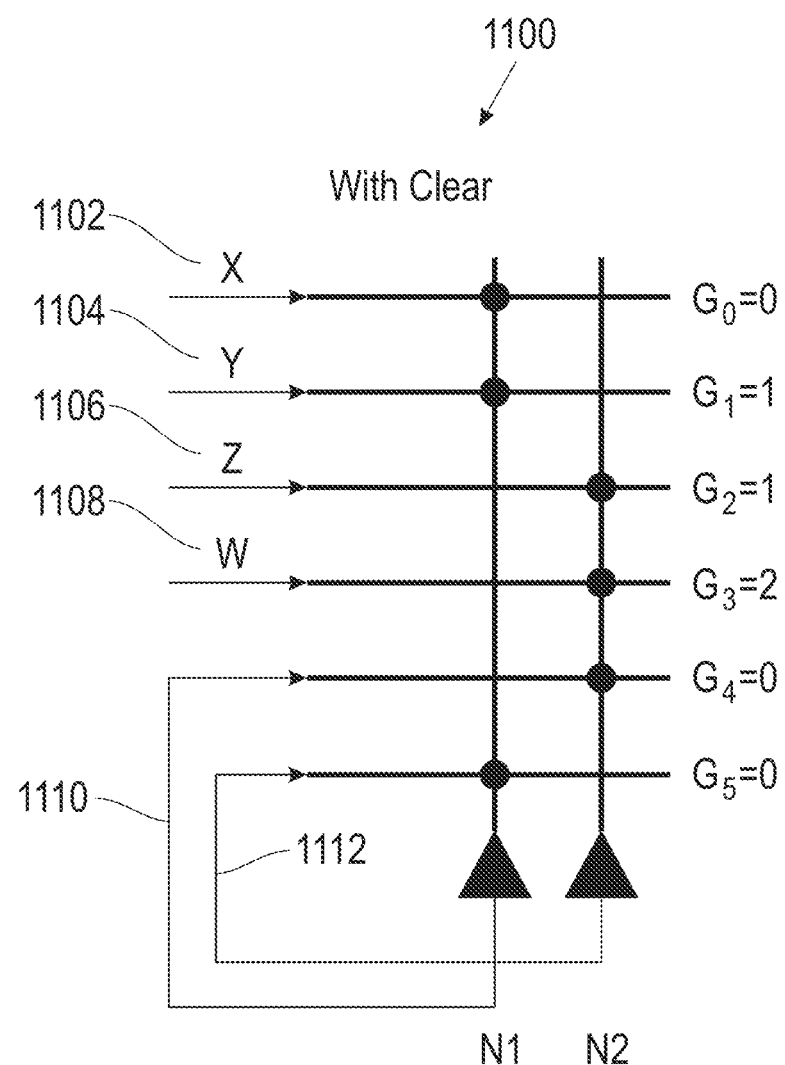
FIG. 11A shows a block diagram of a deterministic rate store (with clear), in accordance with one embodiment.

Referring now to FIG. 11A, a deterministic rate store neuron 1100 is shown according to one embodiment. The deterministic rate store neuron 1000 may act as a multi-valued memory, storing a spike rate. It stores the spike rate in the recurrent feedback connection. It deterministically fires spikes at a given rate until the feedback loop is modified. Excitatory and inhibitory synaptic input increases and decreases the number of spikes in the feedback loop. In addition, the deterministic rate store neuron 1100 has a clear function.

The number of possible rates that may be stored is determined by the delay buffer size in the feedback loop. The output rate is the number of input spikes divided by the number of delay slots in the feedback loop times 1 kHz (or some other value that is equal to the maximum firing rate). Sending an input along input axon X 1102 increases the value (rate) stored in the memory. Conversely, sending inhibitory input along input axon Y 1104 decreases the value (rate) stored in the memory.

In one embodiment, a maximum axon delay of 15 ticks may be set. However, more or less maximum ticks delay may be utilized, as described previously. More timeslots can be added by adding additional delay neurons in the feedback loop (with up to 15 timeslots per delay neuron).

The deterministic rate store neuron 1100 (with clear) is similar to the previously described deterministic rate store neuron 1000 (without clear) in FIG. 10A with the exception that the deterministic rate store neuron 1100 in FIG. 11A has control axon Z 1106 and control axon W 1108 configured for resetting the potential of the memory. The deterministic rate store neuron 1100 uses two neurons labeled N1 and N2. Neuron N1 is similar to the neuron described previously for the deterministic rate store neuron (without clear) with the exception that its output is not sent recursively to neuron N1, but is sent to neuron N2. When this input spike arrives at neuron N2, the neuron parameters lead to an immediate creation of an output spike (due to alpha=1 in neuron N2, according to one embodiment) which in turn is sent as input to neuron N1. Neuron N1, in turn, creates a new input spike sent to neuron N2, and the process repeats.

By controlling the neuron parameters (such as alpha, delay values associated with each neuron, etc.), it is possible to control the output spike rate associated with each input spike. By sending a spike along the control axon Z 1106, a decrease in neuron N2's membrane potential by a predetermined amount takes place, such as a decrease of 2 or some other predetermined amount based on the parameters set for the neuron. This causes a resetting of the neuron's membrane potential (Vm) to −2 (when parameters are set such that beta=2, kappa=1, implying a resetting to −2 based on the neuron equation). At Vm=−2, the N2 neuron does not output any spikes. Then, by sending a single input spike along control axon W 1108, the membrane potential of neuron N2 is caused to increase by 2 (or some other predetermined amount based on the neuron's parameters), which leads to a membrane potential of −2+2=0 for neuron N2. As a result, by sending a spike along control axon Z 1106 followed by a spike along control axon W 1108, neuron N2 has been reset so that it is configured to accept and store a new rate code.

The feedback axons 1110 and 1112 for the deterministic rate store neuron 1100 (with clear) operate in much the same way as the single feedback axon performed in the deterministic rate store neuron (without clear) previously described.

Table 7 reflects the operations that may be performed using the deterministic rate store neuron 1100: write information, store information, and read information, along with the description of the action that takes place in order to accomplish the corresponding method.

TABLE 7

| Method | Description |
|---|---|
| Write | Send excitatory input along input axon X to increase the value (rate) stored in the memory. Send inhibitory input along input axon Y to decrease the value (rate) stored in the memory. Send input along control axon Z to erase the value stored in the memory. Send input along axon W to prepare the memory to be written to. |
| Store | The multi-valued rate the neuron spikes is the value stored in the memory. |
| Read | The rate that the neuron spikes is the value stored in the memory (no explicit read required). |

Figure 11B:
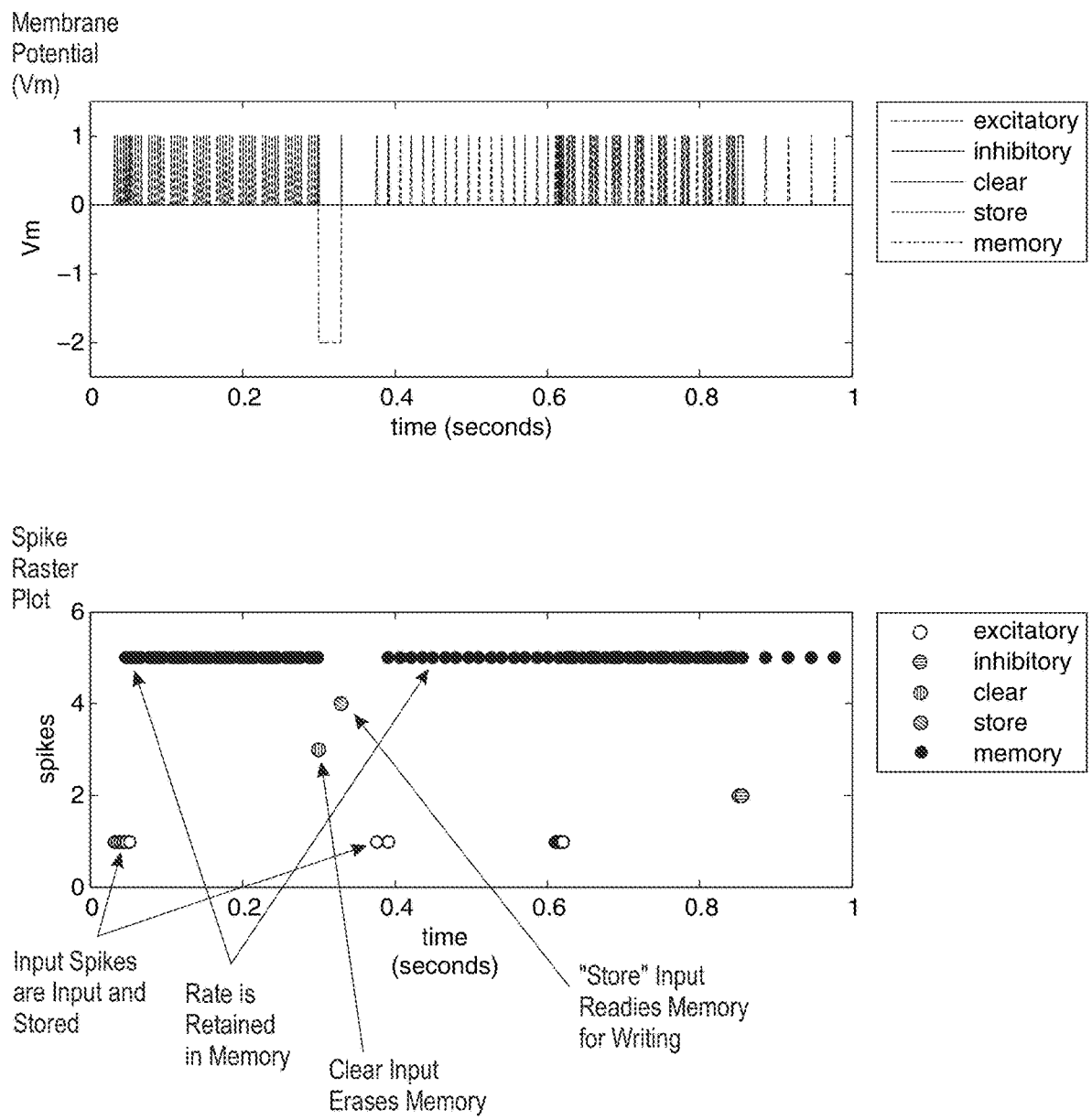
FIG. 11B shows plots of a deterministic rate store (with clear) in operation according to one embodiment.

With reference to FIG. 11B, plots are shown of the deterministic rate store neuron's membrane potential, Vm, in operation. In addition, the spike raster plot is also shown representing the value stored in the neuron. Of course, the values represented by these plots are representative only, and actual potentials and spike frequencies may vary according to application and/or environment.

The deterministic rate store neuron described in FIGS. 11A-11B may be used in any brain-inspired processor to store and retrieve information, according to one embodiment. In addition, the deterministic rate store neuron, in one embodiment, may be implemented in the neuron equation shown in FIG. 3 using the following parameters defining each neuron j. Of course, the parameters may be adjusted to account for the delays and other parameters changes that will allow for implementation in various structures.

For Neuron j of Type N1:
$[s_j^0, s_j^1, s_j^2, s_j^3] = [1, -1, 0, 0]$
$\alpha_j = 1$
$\lambda_j = 0$
$\varepsilon_j = 1$
$\beta_j = 15$
$\kappa_j = 1$
$\gamma_j = 1$
$R_j = 0$
$c_j = 0$
$M_j = 0$
$[b_j^0, b_j^1, b_j^2, b_j^3] = [0,0,0,0]$
$V_j(0) = 0$ (Initial membrane potential)

For Neuron j of Type N2:
$[s_j^0, s_j^1, s_j^2, s_j^3] = [1, -200, 2, 0]$
$\alpha_j = 1$
$\lambda_j = 1$
$\varepsilon_j = 1$
$\beta_j = 2$
$\kappa_j = 1$
$\gamma_j = 0$
$R_j = 0$
$c_j = 0$
$M_j = 0$
$[b_j^0, b_j^1, b_j^2, b_j^3] = [0,0,0,0]$
$V_j(0) = 0$ (Initial membrane potential)

Figure 12A:
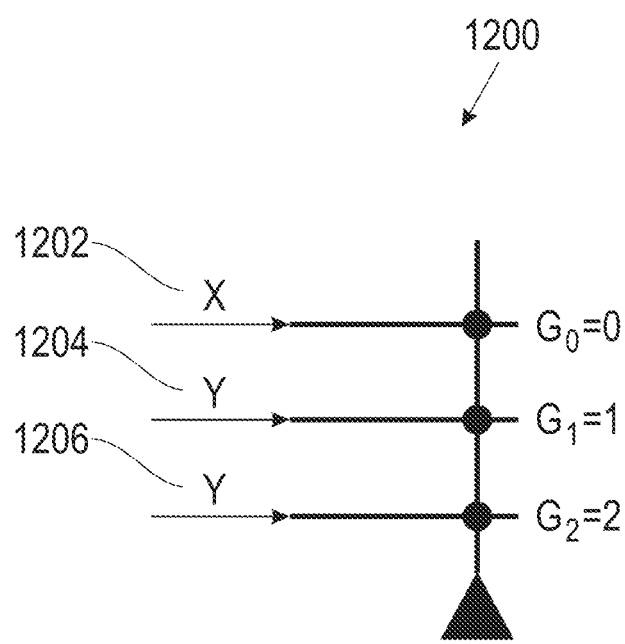
FIG. 12A shows a block diagram of a stochastic rate store, in accordance with one embodiment.

Referring now to FIG. 12A, a stochastic rate store neuron 1200 is shown according to one embodiment. The stochastic rate store neuron 1200 may act as a multi-valued memory, storing a spike rate. It stochastically fires spikes at a given rate until its membrane potential is modified. This neuron type uses a non-zero stochastic threshold and non-reset mode in one embodiment. The stochastic rate store neuron 1200 is configured to accept synaptic input in order to increase a membrane potential of the stochastic rate store neuron 1200. Moreover, synaptic input may also decrease the membrane potential. While the membrane potential is non-zero, the stochastic rate store neuron 1200 will spike stochastically, with probability proportional to the value of the membrane potential, within a range between 0 and a preset ceiling (set by a random threshold mask, in one embodiment). For example, when the membrane potential is a quarter of the range between 0 and the ceiling, the stochastic rate store neuron 1200 fires about 25 times for every 100 ticks.

The stochastic rate store neuron 1200 uses the stochasticity properties of the neuron equation in FIG. 3 to fire a spike at each tick, with a probability that the spike is proportional to the stochastic rate store neuron's membrane potential. Referring again to FIG. 12A, by sending a spike along the input axon X 1202, the membrane potential is incremented by a predetermined value (in this example, 252, due to the various parameters disclosed later). By sending a spike along the input axon Y 1204, the membrane potential is decremented by a predetermined value (in this example, 16, due to the various parameters disclosed later). This provides flexibility in setting the stochastic rate store neuron 1200 to various membrane potentials and thus controlling the probability of a spike being fired. A single spike along the control axon Z 1206 resets the stochastic rate store neuron 1200 to 0. Thus, it is possible to encode a value, making the stochastic rate store neuron 1200 a mechanism for storing rates.

In one embodiment, it is possible to construct a structure that, in combination with the binary pass gate neuron previously described in FIGS. 7A-7C, gates the output so that the stochastic rate store spikes are not propagated at every tick, just at desired ticks when outputs are to be sampled based on the use of the binary pass gate neuron.

Furthermore, by modifying some of the neuron parameters (such as the S values described below), how much the membrane potential is affected by each input spike may be adjusted.

Table 8 reflects the operations that may be performed using the stochastic rate store neuron: write information, store information, and read information, along with the description of the action that takes place in order to accomplish the corresponding method.

TABLE 8

| Method | Description |
|---|---|
| Write | Send excitatory input along input axon X to increase the value (rate) stored in the memory. Send inhibitory input along input axon Y to decrease the value (rate) stored in the memory. Send input along control axon Z to erase the value stored in the memory. |
| Store | The multi-valued rate the neuron spikes (stochastically) is the value stored in the memory. |
| Read | The rate that the neuron spikes is the value stored in the memory (no explicit read required). |

Figure 12B:
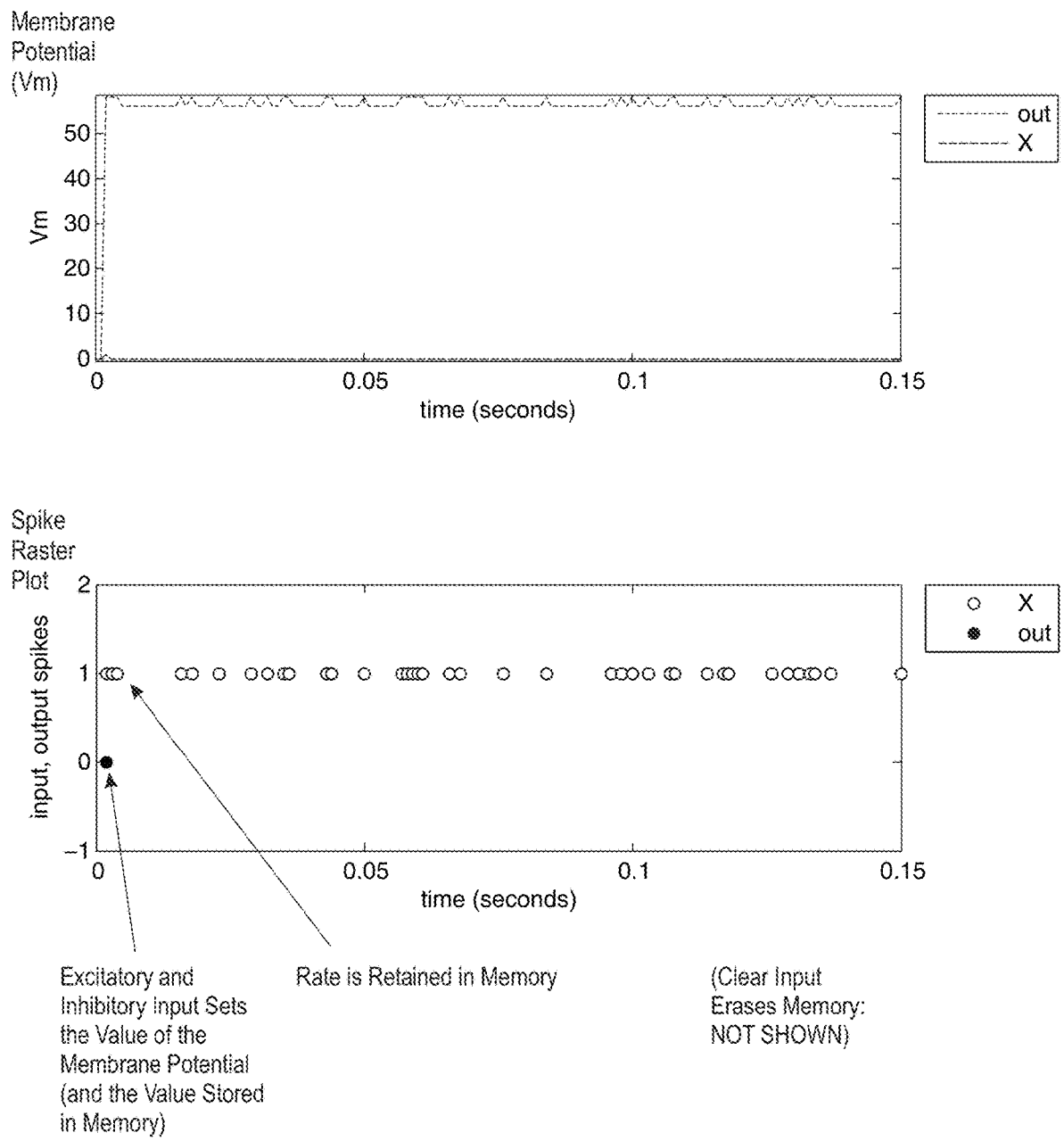
FIG. 12B shows plots of a stochastic rate store in operation according to one embodiment.

With reference to FIG. 12B, plots are shown of the stochastic rate store neuron's membrane potential, Vm, in operation. In addition, the spike raster plot is also shown representing the value stored in the neuron. Of course, the values represented by these plots are representative only, and actual potentials and spike frequencies may vary according to application and/or environment.

The stochastic rate store neuron described in FIGS. 12A-12B may be used in any brain-inspired processor to store and retrieve information, according to one embodiment. In addition, the stochastic rate store neuron, in one embodiment, may be implemented in the neuron equation shown in FIG. 3 using the following parameters defining each neuron j. A delay of 1 is associated with each neuron by default. Of course, the parameters may be adjusted to account for the delays and other parameters changes that will allow for implementation in various structures.

$[s_j^0, s_j^1, s_j^2, s_j^3] = [252, -16, -255, 0]$
$\alpha_j = 1$
$\lambda_j = 0$
$\varepsilon_j = 1$
$\beta_j = 0$
$\kappa_j = 1$
$\gamma_j = 2$
$R_j = 0$
$c_j = 0$
$M_j = 8$
$[b_j^0, b_j^1, b_j^2, b_j^3] = [0,0,0,0]$
$V_j(0) = 0$ (Initial membrane potential)
delay=1 (the delay associated with each neuron)

Figure 13:
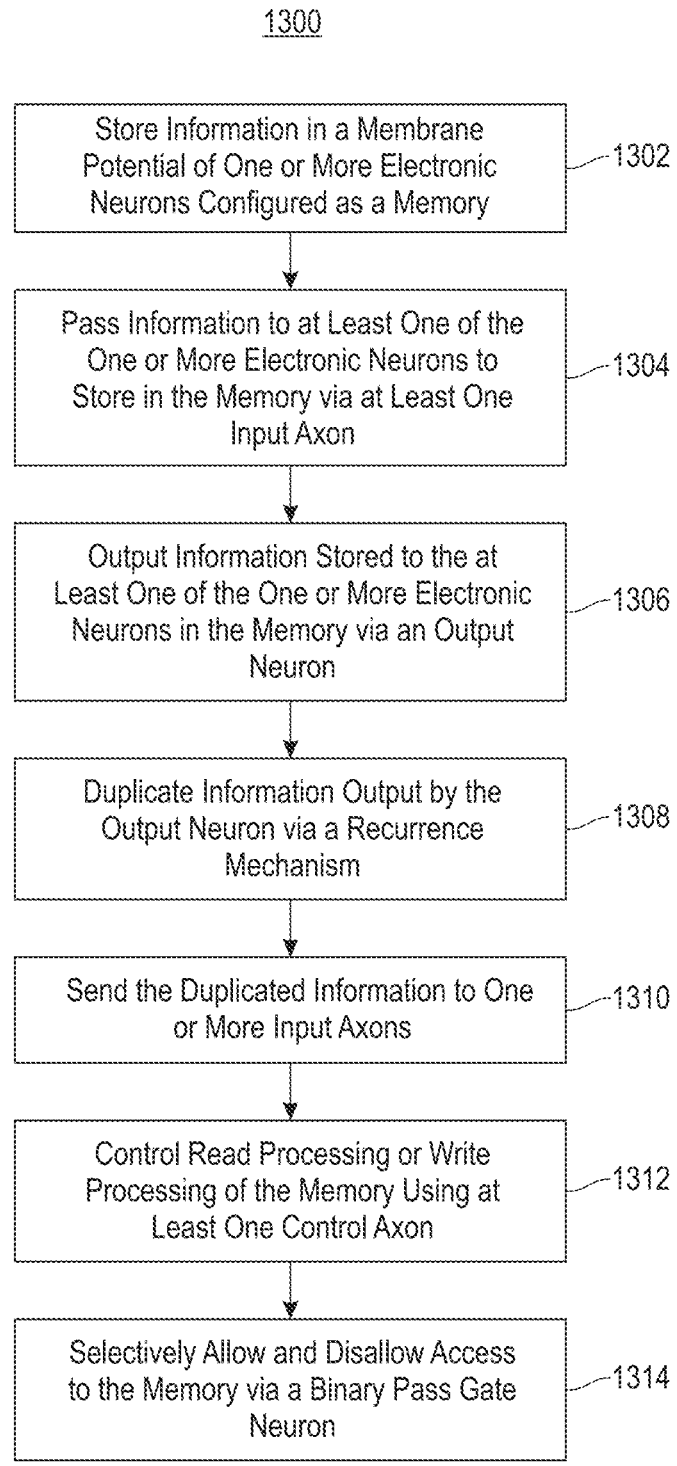
FIG. 13 is a flowchart of a method, according to one embodiment.

Now referring to FIG. 13, a flowchart of a computer-implemented method 1300 for storing data using neuromorphic hardware is shown according to one embodiment. The method 1300 may be performed in accordance with the present invention in any of the environments depicted in FIGS. 1-12B, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by neuromorphic hardware, or some other device having neuromorphic hardware therein. Illustrative neuromorphic hardware include, but are not limited to, a bistable neuron, a tristable neuron, and/or some other neuromorphic hardware described herein, alone or in combination with other neuromorphic hardware, software, and/or hardware.

As shown in FIG. 13, method 1300 may initiate with operation 1302, where information is stored in a membrane potential of one or more electronic neurons configured as a memory. Each neuron is connected to at least one electronic axon via an electronic synapse. However, in one embodiment, information is not stored in any of the synapses, as it is stored exclusively in the membrane potential of one or more of the electronic neurons.

In operation 1304, information is passed to at least one of the one or more electronic neurons to store in the memory via at least one input axon.

In operation 1306, information stored to the at least one of the one or more electronic neurons in the memory is output via an output neuron.

In operation 1308, information output by the output neuron is duplicated, via a recurrence mechanism, such that the information may be replaced in the memory to be read again at a later time.

In operation 1310, the duplicated information is sent to one or more input axons, thereby storing the information to the memory again after it has been read through the output neuron.

In operation 1312, read processing or write processing of the memory is controlled using at least one control axon. The control axon may perform a task to control read processing or write processing. Some exemplary tasks are disclosed below, according to certain embodiments.

These exemplary tasks include triggering information to be read from at least one of the one or more electronic neurons in the memory, triggering information to be stored to at least one of the one or more electronic neurons in the memory, setting an electronic neuron into a bursting state where the electronic neuron outputs a burst code representation of a value stored in the memory, setting an electronic neuron into a waiting state where the electronic neuron does not generate an output spike, and setting an electronic neuron into an off state where the electronic neuron is guaranteed to not output a spike regardless of any input provided to the electronic neuron.

In operation 1314, access to the memory is selectively allowed and disallowed via a binary pass gate neuron.

In one embodiment, the information may be of a type described herein, such as binary-coded information, rate-coded information, and multi-valued information, or may be of a type not explicitly disclosed herein but known to those of skill in the art.

According to one embodiment, method 1300 may include firing the one or more electronic neurons continuously with a user-specified deterministic rate code.

According to another embodiment, method 1300 may include firing the one or more electronic neurons stochastically with a probability that is proportional to the membrane potential of the one or more electronic neurons.

In yet another embodiment, method 1300 may include continuously representing a stored value of the information. In an alternate embodiment, method 1300 may include receiving probing prior to representing a stored value of the information, and representing the stored value in response to receiving the probing.

Any of the various neuromorphic hardware described herein may be utilized to form a memory, such as by coupling one or more neurons to at least one axon via a synapse. Then, the neuron may be utilized to store information in a membrane potential thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
one or more electronic neurons, where at least one of the one or more electronic neurons is configured to store information in a membrane potential thereof to act as a memory; and
one or more electronic axons, wherein each electronic neuron is connected to at least one electronic axon via an electronic synapse, and the one or more electronic axons include:
a set of reset control axons to reset the memory,
a set of input axons to input data for storage in the memory, and
a set of probing control axons that produce output from the memory,
wherein the membrane potential of each of the at least one of the one or more electronic neurons has a first state in which the electronic neuron stores a value of one,
wherein the membrane potential of each of the at least one of the one or more electronic neurons has a second state in which the electronic neuron stores a value of zero,
wherein, for each of the at least one of the one or more electronic neurons:
the electronic neuron is set to a value of zero in response to receiving a first input spike along one of the set of reset control axons which clears the electronic neuron and transitions the electronic neuron to the second state, and
the electronic neuron is set to a value of one in response to receiving one or more additional input spikes along one or more of the set of input axons which transitions the electronic neuron to the first state,
wherein, for each of the at least one of the one or more electronic neurons, in response to receiving a second input spike along one of the set of probing control axons:
the electronic neuron bursts an output spike in response to the membrane potential of the electronic neuron having the first state, and the electronic neuron does not return the output spike in response to the membrane potential of the electronic neuron having the second state.

2. The system as recited in claim 1, wherein each input axon is configured to pass information to at least one of the one or more electronic neurons to store in the membrane potential thereof.

3. The system as recited in claim 2, wherein at least one of the one or more electronic neurons is an output neuron configured to output information stored in the membrane potential of at least one of the one or more electronic neurons in the memory.

4. The system as recited in claim 3, further comprising a recurrence mechanism configured to duplicate information output by the output neuron and send the duplicated information to one or more input axons.

5. The system as recited in claim 1, wherein at least one of the one or more electronic axons is configured to store information in an axon delay buffer thereof to act as the memory, and at least one of the one or more electronic axons is a recurrent connection to at least one of the one or more electronic neurons configured to store information in the axon delay buffer thereof.

6. The system as recited in claim 1, wherein at least one of the one or more electronic axons is a control axon, each control axon being configured to control read processing or write processing of the memory.

7. The system as recited in claim 6, wherein the at least one control axon is configured to perform a task selected from a group consisting of:
   triggering information to be read from at least one of the one or more electronic neurons in the memory;
   triggering information to be stored to at least one of the one or more electronic neurons in the memory;
   setting an electronic neuron into a bursting state where the electronic neuron outputs a burst code representation of a value stored in the memory;
   setting an electronic neuron into a waiting state where the electronic neuron does not generate an output spike; and
   setting an electronic neuron into an off state where the electronic neuron is guaranteed to not output a spike regardless of any input provided to the electronic neuron.

8. The system as recited in claim 1, comprising a binary pass gate neuron configured to selectively allow and disallow access to the memory.

9. The system as recited in claim 1, wherein at least one of the one or more electronic neurons is configured to write binary-coded information to the memory, store the binary-coded information, and read the binary-coded information from the memory.

10. The system as recited in claim 1, wherein at least one of the one or more electronic neurons is configured to write rate-coded information to the memory, store the rate-coded information, and read the rate-coded information from the memory.

11. The system as recited in claim 1, wherein more than one of the one or more electronic neurons are configured to write multi-valued information to the memory, store the multi-valued information, and read the multi-valued information from the memory.

12. The system as recited in claim 1, wherein at least one of the one or more electronic neurons is configured to fire continuously with a user-specified deterministic rate code.

13. The system as recited in claim 1, wherein at least one of the one or more electronic neurons is configured to fire stochastically with a probability that is proportional to the membrane potential of the at least one of the one or more electronic neurons.

14. The system as recited in claim 1, wherein the memory continuously represents a stored value of the information.

15. The system as recited in claim 1, with a proviso that the information is not stored in any electronic synapses.

16. The system as recited in claim 1, wherein:
   each of the one or more electronic neurons are set to a value of zero in response to receiving a single spike via a reset axon,
   the membrane potential each of the one or more electronic neurons encodes a binary value of zero in response receiving the single spike via the reset axon,
   the membrane potential of at least one of the one or more electronic neurons encodes a binary value of one in response to a single input spike via an input axon,
   the membrane potential of at least one of the one or more electronic neurons encodes a binary value of zero in response to a single spike via a reset axon.

17. The system as recited in claim 1, wherein at least one of the one or more electronic axons is further configured to store information in an axon delay buffer thereof to act as a memory, where:
   at least one of the one or more electronic axons is a recurrent connection to at least one of the one or more electronic neurons configured to store information in the axon delay buffer thereof, and
   at least one of the one or more electronic axons is a control axon, each control axon being configured to control read processing or write processing of the memory, where the at least one control axon:
     triggers information to be read from at least one of the one or more electronic neurons in the memory;
     triggers information to be stored to at least one of the one or more electronic neurons in the memory;
     sets an electronic neuron into a bursting state where the electronic neuron outputs a burst code representation of a value stored in the memory;
     sets an electronic neuron into a waiting state where the electronic neuron does not generate an output spike; and
     sets an electronic neuron into an off state where the electronic neuron is guaranteed to not output a spike regardless of any input provided to the electronic neuron.

18. The system as recited in claim 1, wherein:
   at least one of the one or more electronic neurons is an output neuron configured to output information stored in the membrane potential of at least one of the one or more electronic neurons in the memory; and
   the system further comprises a recurrence mechanism configured to duplicate information output by the output neuron and send the duplicated information to one or more input axons.

19. A computer-implemented method, comprising:
   storing information to a memory and retrieving the information from the memory, the memory comprising one or more electronic neurons and one or more electronic axons connected via electronic synapses, where:
   at least one of the one or more electronic neurons is configured to store information in a membrane potential thereof to act as a memory, and
   the one or more electronic axons include:
     a set of reset control axons to reset the memory,
     a set of input axons to input data for storage in the memory, and a set of probing control axons that produce output from the memory, wherein the membrane potential of each of the at least one of the one or more electronic neurons has a first state in which the electronic neuron stores a value of one, wherein the membrane potential of each of the at least one of the one or more electronic neurons has a second state in which the electronic neuron stores a value of zero, wherein, for each of the one or more electronic neurons:

storing the information to the memory includes sending a first input spike to the electronic neuron along one of the set of reset control axons to clear the electronic neuron and transition the electronic neuron to the second state and set the electronic neuron to a value of zero, and storing the information to the memory includes sending the electronic neuron one or more additional input spikes along one or more of the set of input axons to transition the electronic neuron to the first state and set the electronic neuron to a value of one, retrieving the information from the memory includes sending the electronic neuron a second input spike along one of the set of probing control axons, where in response to the second input spike, the electronic neuron bursts an output spike in response to the membrane potential of the electronic neuron having the first state, and the electronic neuron does not return the output spike in response to the membrane potential of the electronic neuron having the second state.

20. The method as recited in claim 19, comprising:

outputting information stored to the at least one of the one or more electronic neurons in the memory via an output neuron.

21. The method as recited in claim 20, comprising:

duplicating information output by the output neuron via a recurrence mechanism; and sending the duplicated information to one or more input axons.

22. The method as recited in claim 20, comprising:

controlling read processing or write processing of the memory using at least one control axon; and performing a task, using the at least one control axon, selected from a group consisting of:

triggering information to be read from at least one of the one or more electronic neurons in the memory;

triggering information to be stored to at least one of the one or more electronic neurons in the memory;

setting an electronic neuron into a bursting state where the electronic neuron outputs a burst code representation of a value stored in the memory;

setting an electronic neuron into a waiting state where the electronic neuron does not generate an output spike; and setting an electronic neuron into an off state where the electronic neuron is guaranteed to not output a spike regardless of any input provided to the electronic neuron.

23. The method as recited in claim 19, comprising selectively allowing and disallowing access to the memory via a binary pass gate neuron.

24. The method as recited in claim 19, wherein the information is selected from a group consisting of: binary-coded information, rate-coded information, and multi-valued information.

* * * * *